(12) United States Patent
Miller et al.

(10) Patent No.: US 10,909,140 B2
(45) Date of Patent: Feb. 2, 2021

(54) CLUSTERING EVENTS BASED ON EXTRACTION RULES

(71) Applicant: SPLUNK INC., San Francisco, CA (US)

(72) Inventors: Jesse Brandau Miller, Piedmont, CA (US); Katherine Kyle Feeney, San Francisco, CA (US); Yuan Xie, San Francisco, CA (US); Steve Zhang, San Francisco, CA (US); Adam Jamison Oliner, San Francisco, CA (US); Jindrich Dinga, San Francisco, CA (US); Jacob Leverich, San Francisco, CA (US)

(73) Assignee: SPLUNK Inc., San Francisco, CA (US)

( * ) Notice: Subject to any disclaimer, the term of this patent is extended or adjusted under 35 U.S.C. 154(b) by 949 days.

(21) Appl. No.: 15/276,693

(22) Filed: Sep. 26, 2016

(65) Prior Publication Data
US 2018/0089303 A1    Mar. 29, 2018

(51) Int. Cl.
*G06F 16/00* (2019.01)
*G06F 16/26* (2019.01)

(52) U.S. Cl.
CPC ................... *G06F 16/26* (2019.01)

(58) Field of Classification Search
CPC ........................................... G06F 16/26
See application file for complete search history.

(56) References Cited

U.S. PATENT DOCUMENTS

| | | | |
|---|---|---|---|
| 5,542,006 A | 7/1996 | Shustorovich et al. | |
| 5,841,946 A | 11/1998 | Naito et al. | |
| 8,909,642 B2 * | 12/2014 | Carasso | G06F 17/271 707/736 |
| 9,021,304 B2 * | 4/2015 | Tonouchi | G06F 11/0781 714/25 |
| 9,146,962 B1 * | 9/2015 | Boe | G06F 16/2228 |
| 9,596,252 B2 * | 3/2017 | Coates | H04L 63/1416 |
| 10,193,775 B2 * | 1/2019 | Fletcher | G06F 3/0484 |
| 10,310,615 B2 * | 6/2019 | Lee | G06F 3/017 |
| 10,331,720 B2 * | 6/2019 | Neels | G06F 16/338 |
| 2004/0024773 A1 * | 2/2004 | Stoffel | G06K 9/6282 |
| 2009/0030860 A1 | 1/2009 | Leitheiser | |

(Continued)

OTHER PUBLICATIONS

Non-Final Office Action dated May 30, 2019 in U.S. Appl. No. 15/420,754, 15 pages.

(Continued)

*Primary Examiner* — Debbie M Le
(74) *Attorney, Agent, or Firm* — Shook, Hardy & Bacon L.L.P.

(57) ABSTRACT

Systems and methods include causing presentation of a first cluster in association with an event of the first cluster, the first cluster from a first set of clusters of events. Each event includes a time stamp and event data. Based on the presentation of the first cluster, an extraction rule corresponding to the event of the first cluster is received from a user. Similarities in the event data between the events are determined based on the received extraction rule. The events are grouped into a second set of clusters based on the determined similarities. Presentation is caused of a second cluster in association with an event of the second cluster, where the second cluster is from the second set of clusters.

30 Claims, 30 Drawing Sheets

(56) References Cited

U.S. PATENT DOCUMENTS

2011/0066585 A1* 3/2011 Subrahmanyam ..... G06N 7/005
                                                    706/52
2015/0347859 A1  12/2015 Dixon et al.
2016/0350655 A1  12/2016 Weiss et al.
2019/0310715 A1* 10/2019 Lee ..................... G06F 3/0488

OTHER PUBLICATIONS

Non-Final Office Action dated Sep. 26, 2019 in U.S. Appl. No. 15/420,754, 15 pages.
Notice of Allowance dated Feb. 7, 2020 in U.S. Appl. No. 15/420,754. 7 pages.

* cited by examiner

Data Summary

| Hosts (5) | Sources (8) | Sourcetypes (3) | | ✕ |

( filter )

| Host ⇅ | | Count ⇅ | Last Update ⇅ |
|---|---|---|---|
| mailsv | ⅆ ⌄ | 9,829 | 4/29/14 1:32:47.000 PM |
| vendor_sales | ⅆ ⌄ | 30,244 | 4/29/14 1:32:46.000 PM |
| www1 | ⅆ ⌄ | 24,221 | 4/29/14 1:32:44.000 PM |
| www2 | ⅆ ⌄ | 22,595 | 4/29/14 1:32:47.000 PM |
| www3 | ⅆ ⌄ | 22,975 | 4/29/14 1:32:45.000 PM |

INCIDENT REVIEW DATSHBOARD 910

Incident Review | Actions ▼

Status: [ ]　　Urgency: [high]　　Owner: [ ]　　Title: [ ]

Security domain: [ ]　　Governance: [pci]　　Search: [ ]

TIME RANGE FIELD 912 → [24 hour window ▼]

- Last 15 minutes
- Last 60 minutes
- Last 4 hours
- Last 24 hours
- Last 7 days
- Last 30 days
- Last year
- Real-time
- All time
- Other
- Custom time....

INCIDENT ATTRIBUTE FIELDS 911

[i] [◨] [⊞ Save ▼] [⊞ Create ▼]

Linear scale ▼　1 bar = 1 hour

TIMELINE 913　120 / 60

✓ 225 matching events

◧ Hide　 ⊖ Zoom out　 ⊕ Zoom to selection　 [×] Deselect 120
60
4:00 AM　　　　6:00 AM　　　　8:00 AM
Sun Aug 26
2012

225 events in a 24 hour window (real-time) (from 11:29:20 AM August 25 to 11:29:20 AM August 26, 2012)
« prev  1  2  3  4  5  6  7  8  9  10  next »  | Edit selected events | Edit all 225 matching Select all | Unselect all

EVENTS LIST 914

| Select | Options | Time | Security Domain | Title | Urgency | Status | Owner | |
|---|---|---|---|---|---|---|---|---|
| ☐ | ▶ | 8/26/12 11:11:03.000 AM | Access ▼ | Insecure Or Cleartext Authentication Detected ▼ | ⊙ High ▼ | New ▼ | unassigned ▼ | View details ▼ |
| ☐ | ▶ | 8/26/12 11:10:07.000 AM | Access ▼ | Insecure Or Cleartext Authentication Detected ▼ | ⊙ High ▼ | New ▼ | unassigned ▼ | View details ▼ |
| ☐ | ▶ | 8/26/12 11:00:39.000 AM | Access ▼ | Account (blinebry) Deleted On (PROD-POS-001) ▼ | ⊙ High ▼ | New ▼ | unassigned ▼ | View details ▼ |
| ☐ | ▶ | 8/26/12 11:00:39.000 AM | Access ▼ | Account (beu) Deleted On (COREDEV-006) ▼ | ⊙ High ▼ | New ▼ | unassigned ▼ | View details ▼ |
| ☐ | ▶ | 8/26/12 11:00:39.000 AM | Access ▼ | Account (combs) Deleted On (HOST-005) ▼ | ⊙ High ▼ | New ▼ | unassigned ▼ | View details ▼ |
| ☐ | ▶ | 8/28/12 | Access ▼ | Account (wisner) Deleted On (BUSDEV-005) ▼ | ⊙ High ▼ | New ▼ | unassigned ▼ | View details ▼ |

Field Extractor: alcatel

Search  Datasets  Reports  Alerts  Dashboards

Sample: 1,000 events ˅

48 Unique Event Patterns Found                                View Extraction Progress

Pattern-1
Jul 24 00:03:24 172.22.7.4 %LINK-I-Up| e13  ← 1810

Extract a field from a sample value.  ← 1812

Field Name [type]

Pattern-3
Jul 24 00:02:  Sample Value LINK-I-Up

Pattern-4
Jul 24 00:02:  [ Add Extraction ]  ← 1814     STP status Forwarding

Pattern-5
Jul 24 00:02:51 172.22.70.4 %STP-W-PORTSTATUS: e11: STP status Forwarding

Pattern-6
Jul 24 00:02:41 172.22.98.4 %LINK-W-Down: e4

Pattern-7
Jul 24 00:02:25 172.22.88.4 %LINK-I-Up: e14

Pattern-8

Extracted Fields

0 Fields
— 1806A
— 1806B
— 1806C
— 1806D
— 1806E
— 1806F
— 1806G
— 1806H

Search & Reporting

[ Cancel ] [ Save ]

Value Inspector

*Filter*

Field Extractor: alcatel

Search    Datasets    Reports    Alerts    Dashboards

Sample: 1,000 events ▾

32 Unique Event Patterns Found      View Extraction Progress — 1834

Pattern-1
Jul 24 00:03:24 172.22.7.4 %[LINK-I-Up] e13    1850

Pattern-2
Jul 24 00:03:05 172.22.98.4 %[STP-W-PORTSTATUS] e4: STP status Forwarding — 1854

Pattern-3
Jul 24 00:02:57 172.22.68.4 % [Create New] [Add to Existing]   rding Field Name    [ecode] — 1852

Pattern-4
Jul 24 00:02:54 172.22.76.4 % Sample Value 4   rding

[Add Extraction]

Pattern-5
Jul 24 00:02:51 172.22.70.4 %

Pattern-6
Jul 24 00:02:41 172.22.98.4 %[LINK-W-Down] e4

Pattern-7
Jul 24 00:02:25 172.22.88.4 %[LINK-I-Up] e14

Pattern-8

---

Extracted Fields    1830
1 Fields

[type] — 1842A
   1842B
    1832
1842C

Generated Regular Expressions

Regex 1
`^[^|]*?(|)[^%]*?(%)[^|]*?(|)[^%]*?(%)[^|]*?(|)[^%]*?(%)`
`(?<type>[^:]+)(:).*?$` — 1870

---

Search & Reporting

[Cancel] [Save]

*Filter*

Value Inspector
3 Values

LINK-I-Up      34.5%
LINK-W-Down    33.4%
STP-W-PORTSTATUS   32.1%

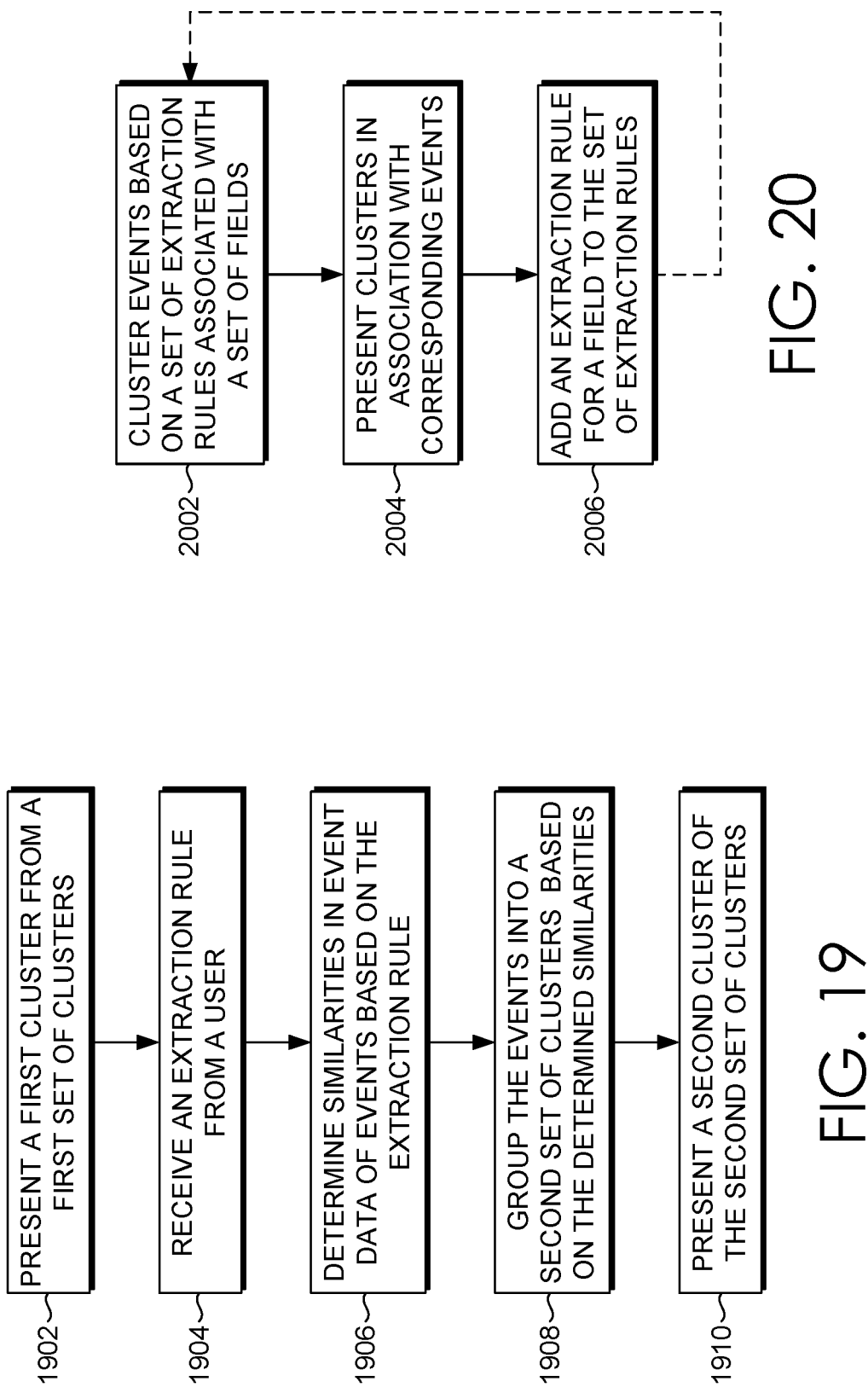

CLUSTERING EVENTS BASED ON EXTRACTION RULES

BACKGROUND

Modern data centers often include thousands of hosts that operate collectively to service requests from even larger numbers of remote clients. During operation, components of these data centers can produce significant volumes of machine-generated data. In order to reduce the size of the data, it is typically pre-processed before it is stored. In some instances, the pre-processing includes extracting and storing some of the data, but discarding the remainder of the data. Although this may save storage space in the short term, it can be undesirable in the long term. For example, if the discarded data is later determined to be of use, it may no longer be available.

In some instances, techniques have been developed to apply minimal processing to the data in an attempt to preserve more of the data for later use. For example, the data may be maintained in a relatively unstructured form to reduce the loss of relevant data. Unfortunately, the unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be a priority. Moreover, processing of the data may return a large amount of information that can be difficult for a user to interpret. For example, if a user submits a search of the data, the user may be provided with a large set of search results for the data but may not know how the search results relate to the data itself or how the search results relate to one another. As a result, a user may have a difficult time deciphering what portions of the data or the search results are relevant to her/his inquiry.

SUMMARY

Embodiments of the present invention are directed to clustering events based on extraction rules. In various implementations, events are clustered, or grouped, at least partially based on extraction rules associated with the events. For example, the events can be clustered based on similarities identified by applying one or more extraction rules to event data. As additional extraction rules are received for the events, the events can be reclustered based on the additional extraction rules.

In some respects, one or more of the extraction rules can be provided by a user, such as through an interactive field generator that presents at least one of the clusters in association with at least one event. The user can select one or more portions of event data corresponding to the presented cluster. The system uses the selected portions as sample data in order to generate an extraction rule. The extraction rule can be used to recluster the events and at least one of the reclustered events are presented in association with at least one event. This can be repeated as the user continues generating, modifying, and/or removing extraction rules from the set of extraction rules applied to clustering. As the set changes, the user can view the impact of these actions on the clustering to better understand the coverage of the extraction rules on the event data.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Implementations of the present disclosure are described in detail below with reference to the attached drawing figures, wherein:

FIG. 6B illustrates a data summary dialog that enables a user to select various data sources in accordance with the disclosed embodiments;

FIGS. 7A-7D illustrate a series of user interface screens for an example data model-driven report generation interface in accordance with the disclosed embodiments;

FIG. 9B illustrates an incident review dashboard in accordance with the disclosed embodiments;

FIGS. 15-17 illustrate example visualizations generated by a reporting application in accordance with the disclosed embodiments;

FIG. 18B illustrates an example of a field generation interface in accordance with the disclosed embodiments.

FIG. 18C illustrates an example of a field generation interface in accordance with the disclosed embodiments.

FIG. 18D illustrates an example of a field generation interface in accordance with the disclosed embodiments.

FIG. 18E illustrates an example of a field generation interface in accordance with the disclosed embodiments.

FIG. 19 presents a flowchart illustrating a method in accordance with the disclosed embodiments.

FIG. 20 presents a flowchart illustrating a method in accordance with the disclosed embodiments.

DETAILED DESCRIPTION

Figure 1:
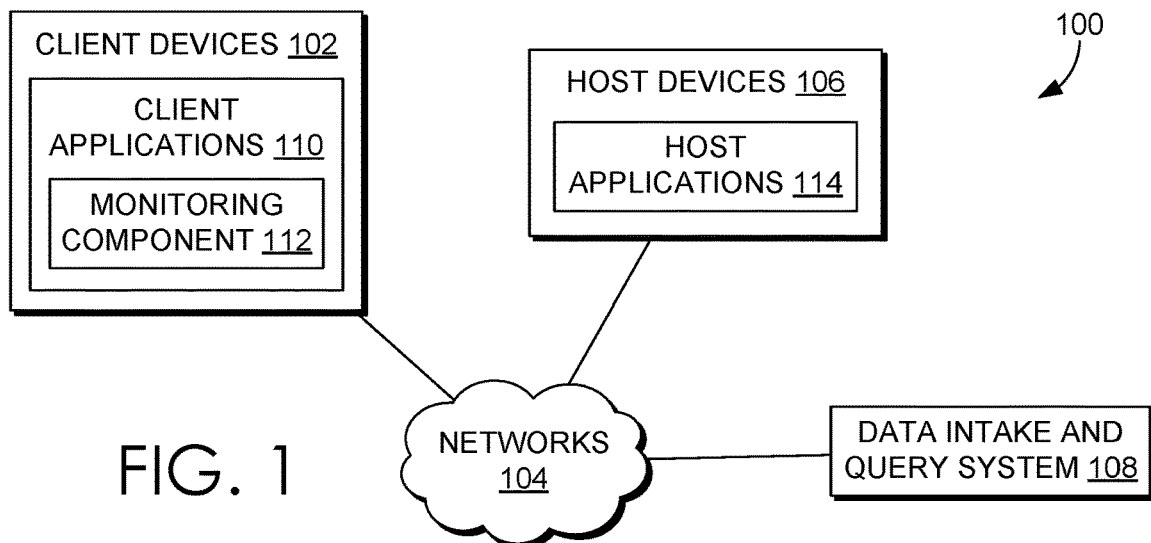
FIG. 1 illustrates a networked computer environment in which an embodiment may be implemented.

Embodiments are described herein according to the following outline:
1.0. General Overview
2.0. Operating Environment
   2.1. Host Devices
   2.2. Client Devices
   2.3. Client Device Applications
   2.4. Data Server System
   2.5. Data Ingestion
      2.5.1. Input
      2.5.2. Parsing
      2.5.3. Indexing
   2.6. Query Processing
   2.7. Field Extraction
   2.8. Example Search Screen
   2.9. Data Modelling
   2.10. Acceleration Techniques
      2.10.1. Aggregation Technique
      2.10.2. Keyword Index
      2.10.3. High Performance Analytics Store
      2.10.4. Accelerating Report Generation
   2.11. Security Features
   2.12. Data Center Monitoring
   2.13. Cloud-Based System Overview
   2.14. Searching Externally Archived Data
      2.14.1. ERP Process Features
   2.15. IT Service Monitoring
3.0. Event Clustering
   3.1. Event Clustering based on Extraction Rules
   3.2. Types of Extraction Rules Applied to Clustering
   3.3. Interactive Field Generator
   3.4 Additional Implementations 1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue to investigate and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
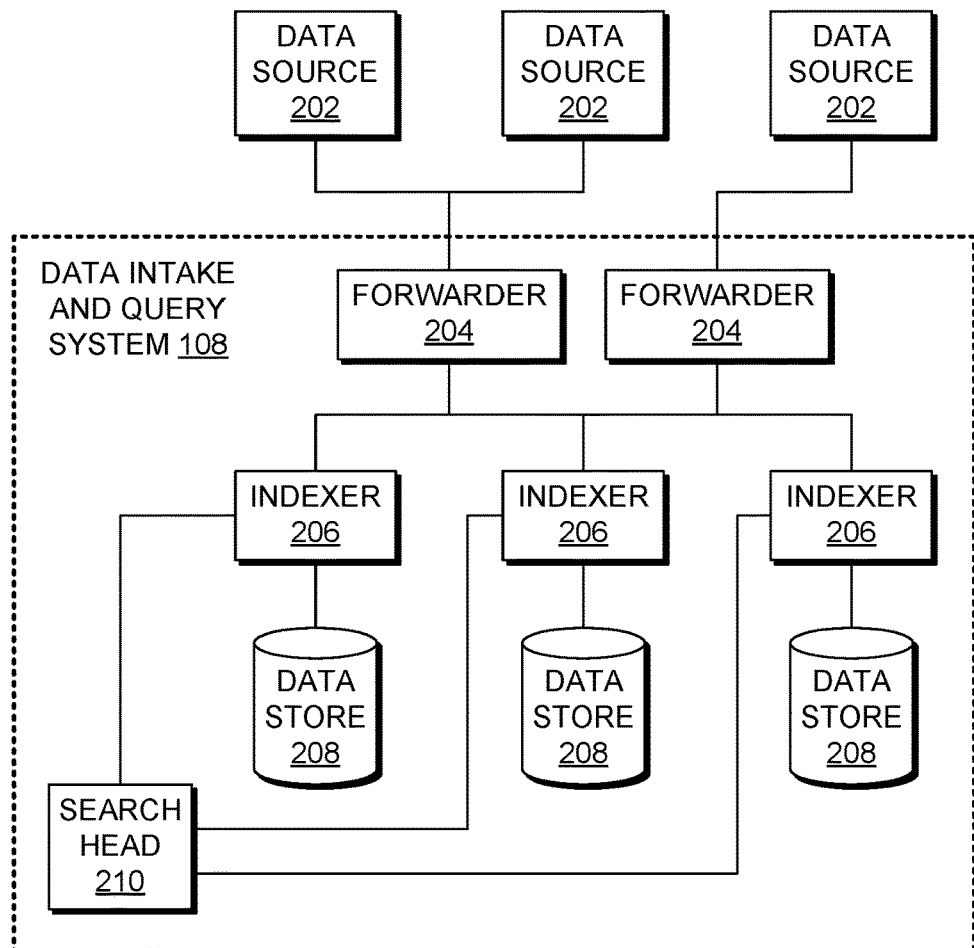
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
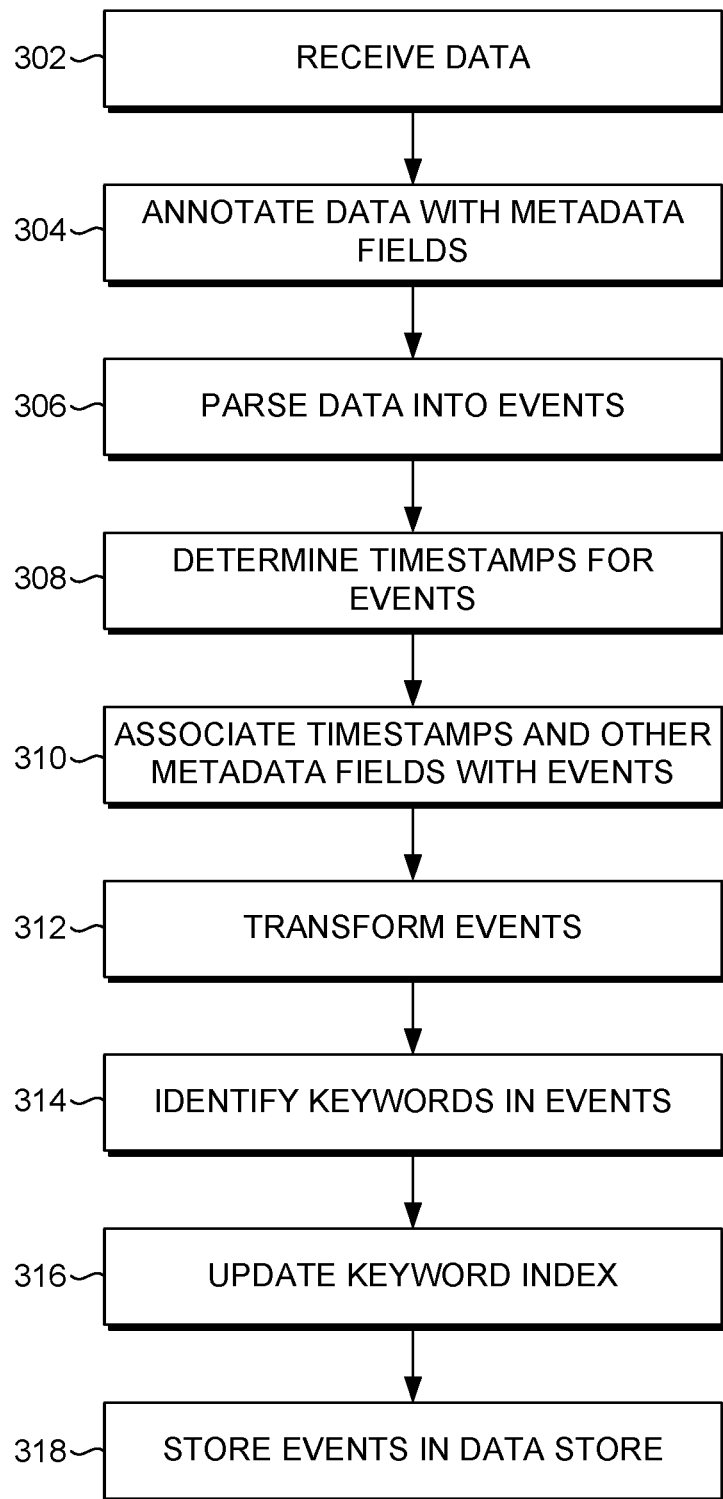
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks," or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dent" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
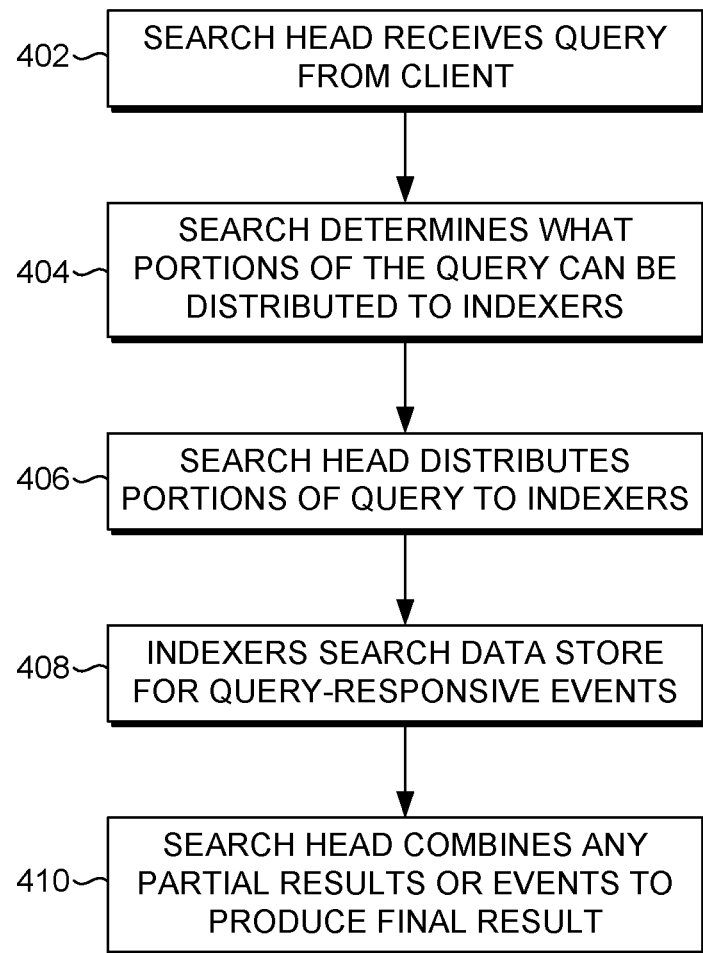
FIG. 4 is a flow diagram that illustrates how a search head and indexers perform a search query in accordance with the disclosed embodiments.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "I" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
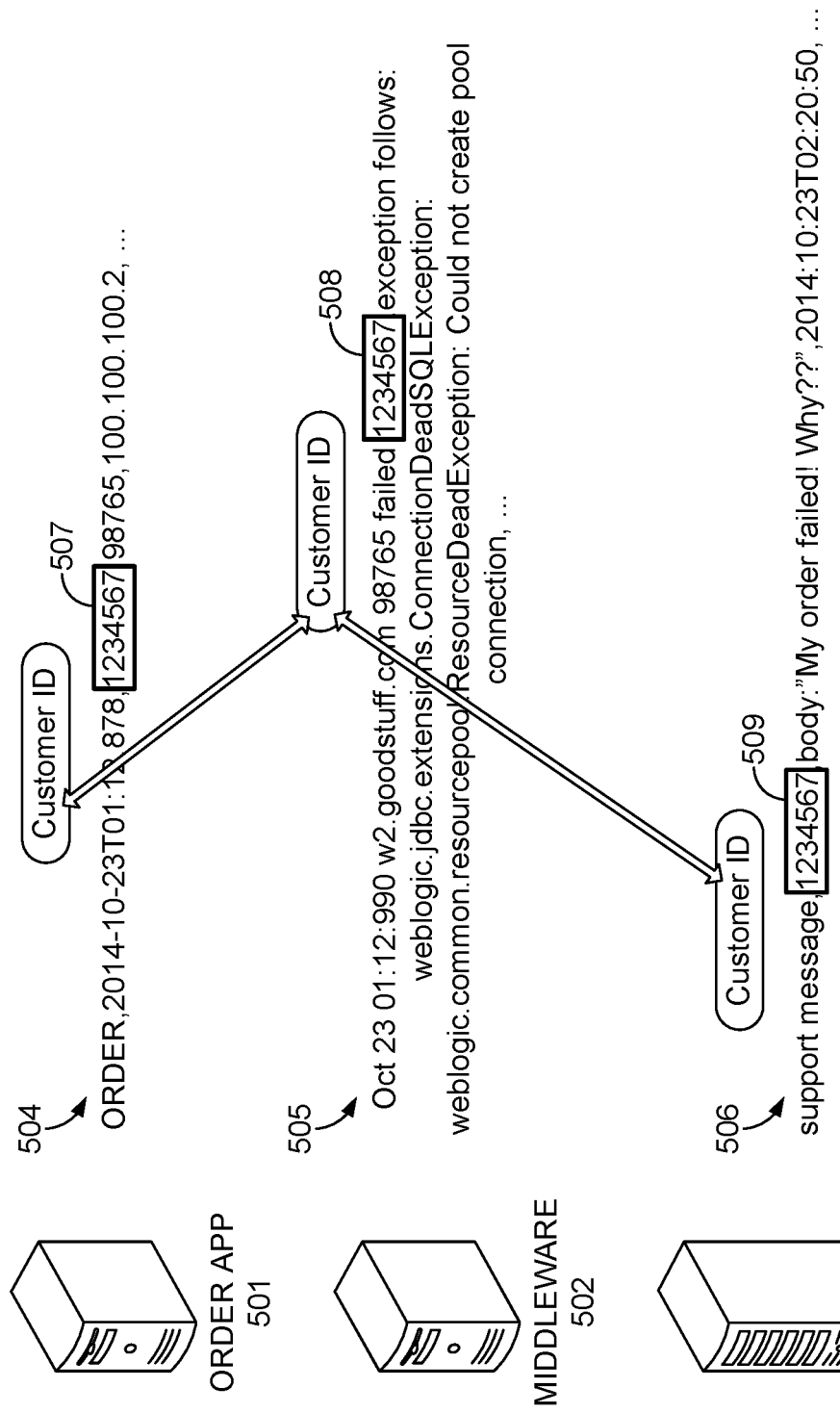
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
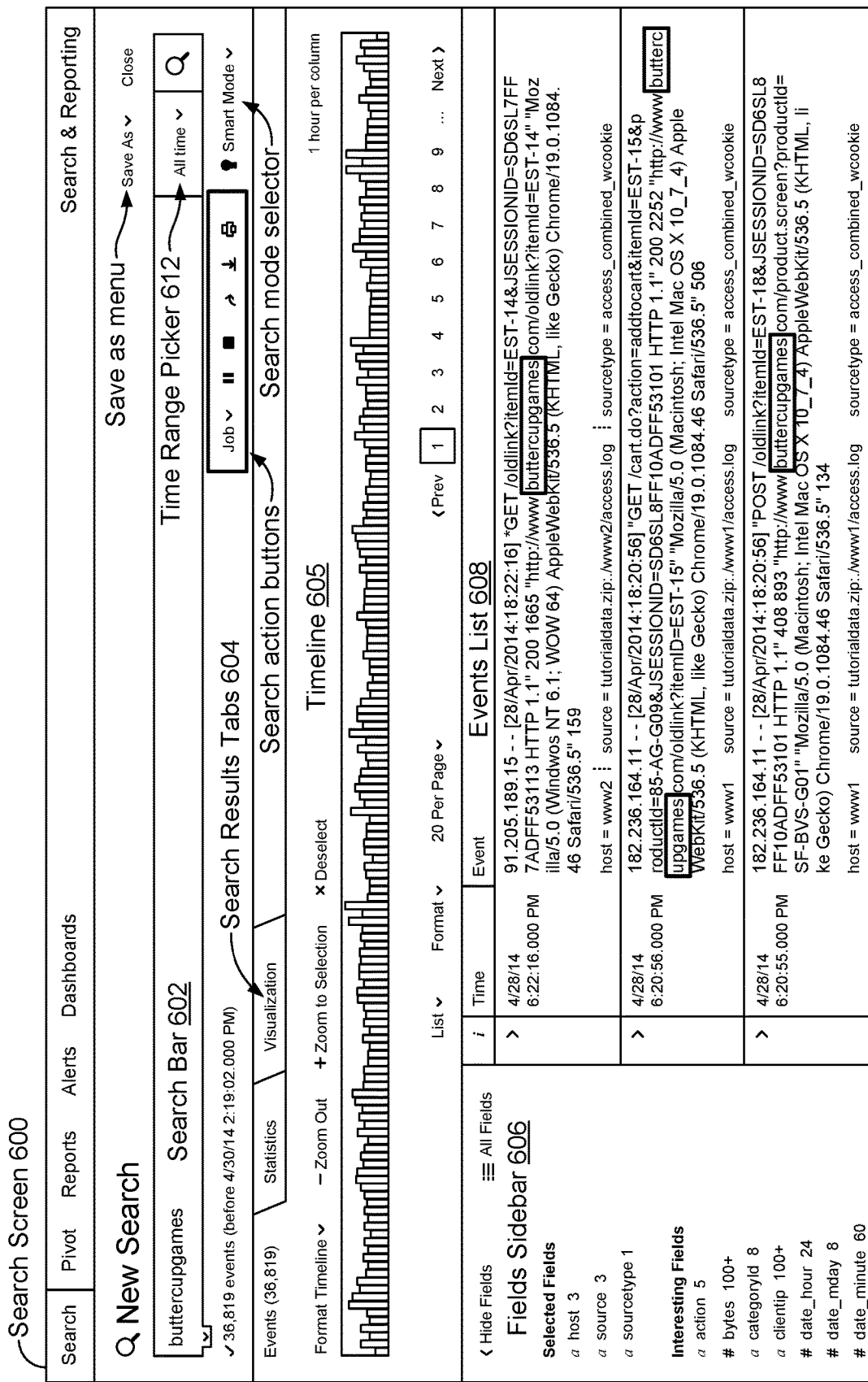
FIG. 6A illustrates a search screen in accordance with the disclosed embodiments.

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in Fig.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

FIGS. 12, 13, and 7A-7D illustrate a series of user interface screens where a user may select report generation options using data models. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 12:
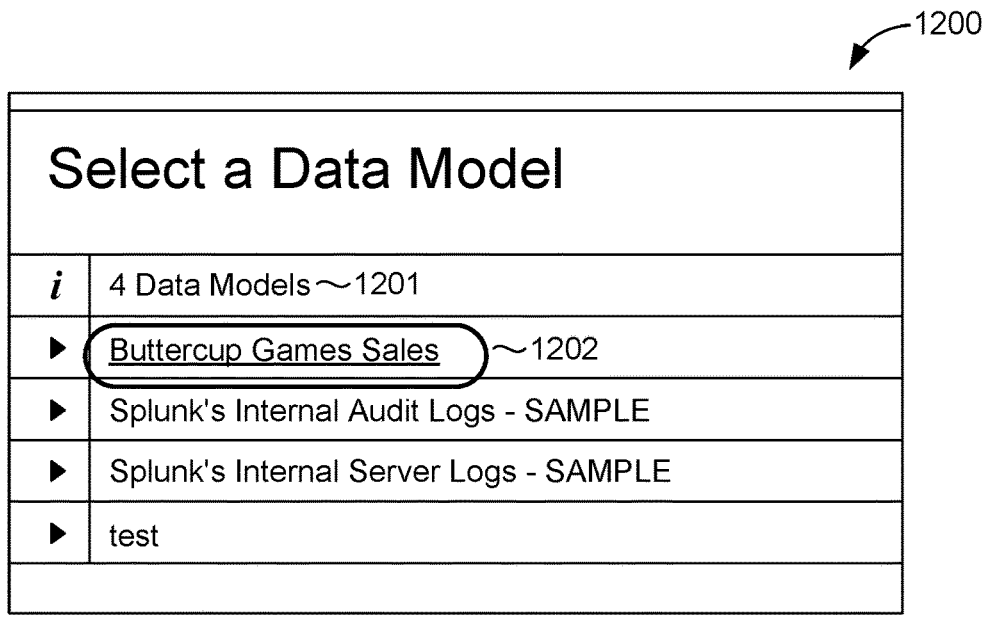
FIGS. 12-14 illustrate a series of user interface screens for an example data model-driven report generation interface in accordance with the disclosed embodiments.

The selection of a data model object for use in driving a report generation may be facilitated by a data model object selection interface. FIG. 12 illustrates an example interactive data model selection graphical user interface 1200 of a report editor that displays a listing of available data models 1201. The user may select one of the data models 1202.

Figure 13:
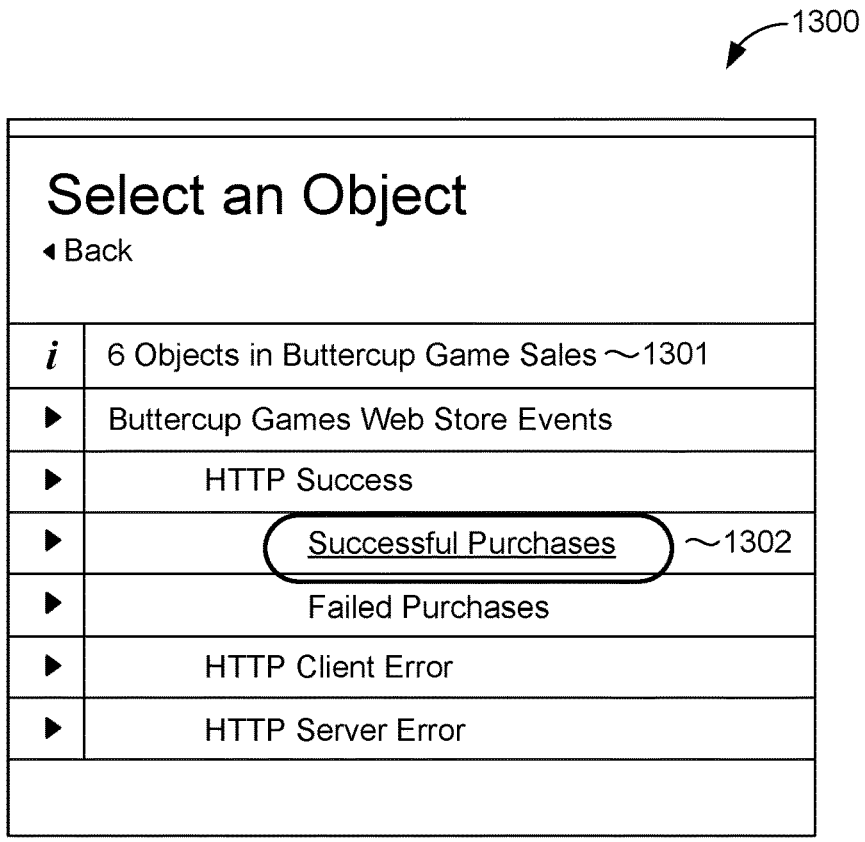

FIG. 13 illustrates an example data model object selection graphical user interface 1300 that displays available data objects 1301 for the selected data object model 1202. The user may select one of the displayed data model objects 1302 for use in driving the report generation process.

Figure 7A:
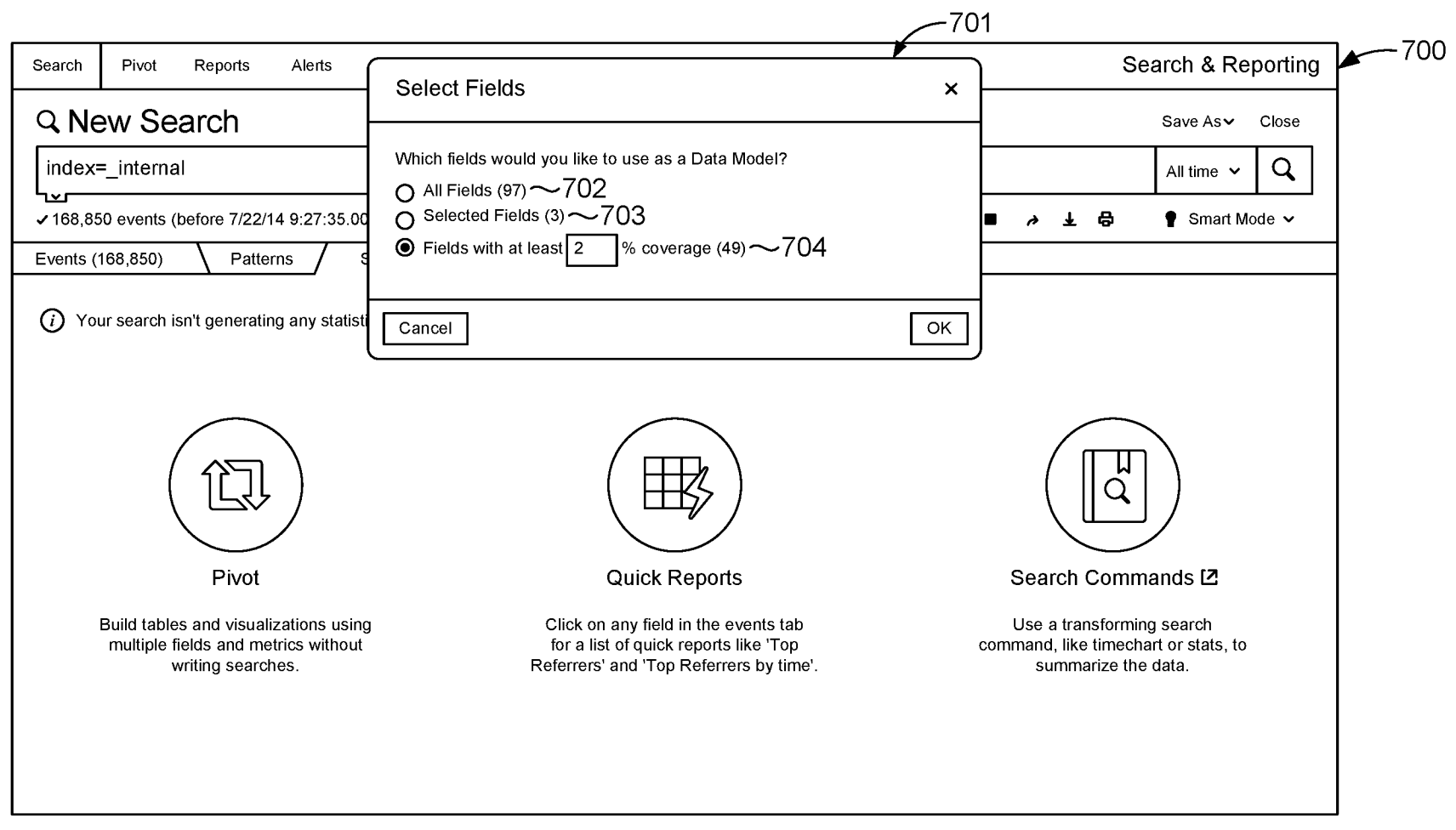

Once a data model object is selected by the user, a user interface screen 700 shown in FIG. 7A may display an interactive listing of automatic field identification options 701 based on the selected data model object. For example, a user may select one of the three illustrated options (e.g., the "All Fields" option 702, the "Selected Fields" option 703, or the "Coverage" option (e.g., fields with at least a specified % of coverage) 704). If the user selects the "All Fields" option 702, all of the fields identified from the events that were returned in response to an initial search query may be selected. That is, for example, all of the fields of the identified data model object fields may be selected. If the user selects the "Selected Fields" option 703, only the fields from the fields of the identified data model object fields that are selected by the user may be used. If the user selects the "Coverage" option 704, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 702 indicates that 97 fields will be selected if the "All Fields" option is selected. The "3" displayed next to the "Selected Fields" option 703 indicates that 3 of the 97 fields will be selected if the "Selected Fields" option is selected. The "49" displayed next to the "Coverage" option 704 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 7B:
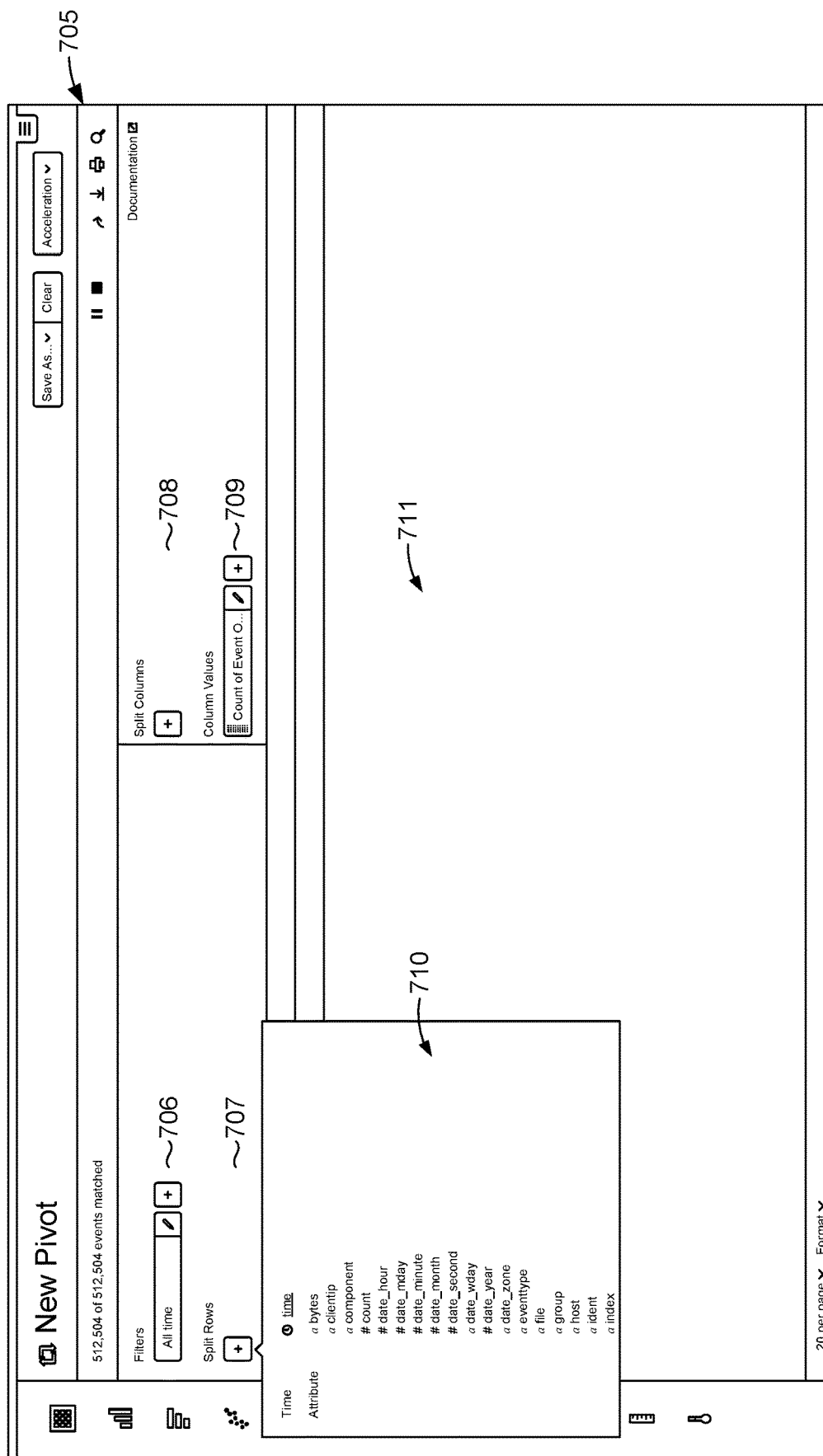
Figure 7C:
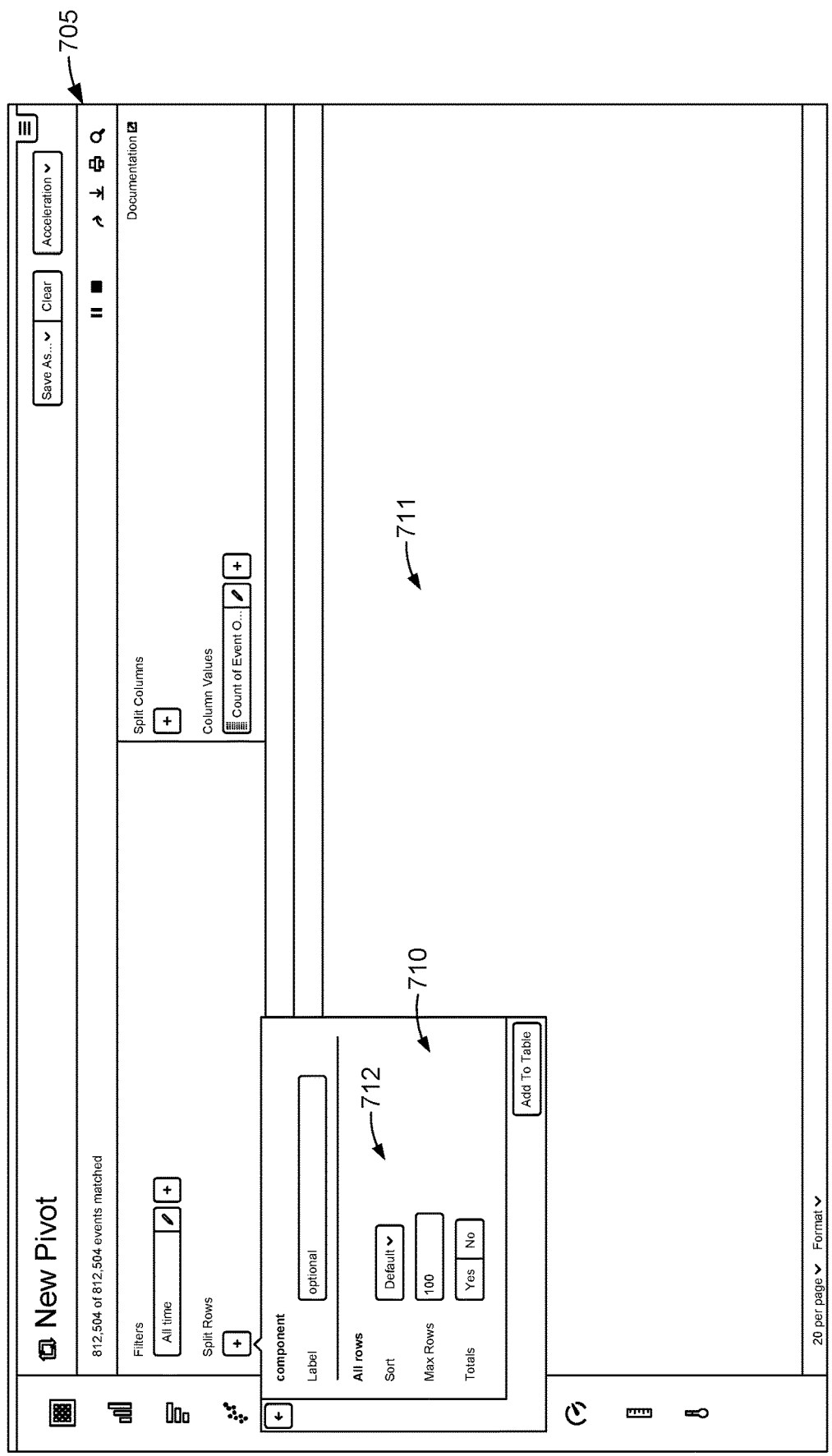

FIG. 7B illustrates an example graphical user interface screen (also called the pivot interface) 705 displaying the reporting application's "Report Editor" page. The screen may display interactive elements for defining various elements of a report. For example, the page includes a "Filters" element 706, a "Split Rows" element 707, a "Split Columns" element 708, and a "Column Values" element 709. The page may include a list of search results 711. In this example, the Split Rows element 707 is expanded, revealing a listing of fields 710 that can be used to define additional criteria (e.g., reporting criteria). The listing of fields 710 may correspond to the selected fields (attributes). That is, the listing of fields 710 may list only the fields previously selected, either automatically and/or manually by a user. FIG. 7C illustrates a formatting dialogue 712 that may be displayed upon selecting a field from the listing of fields 710. The dialogue can be used to format the display of the results of the selection (e.g., label the column to be displayed as "component").

Figure 7D:
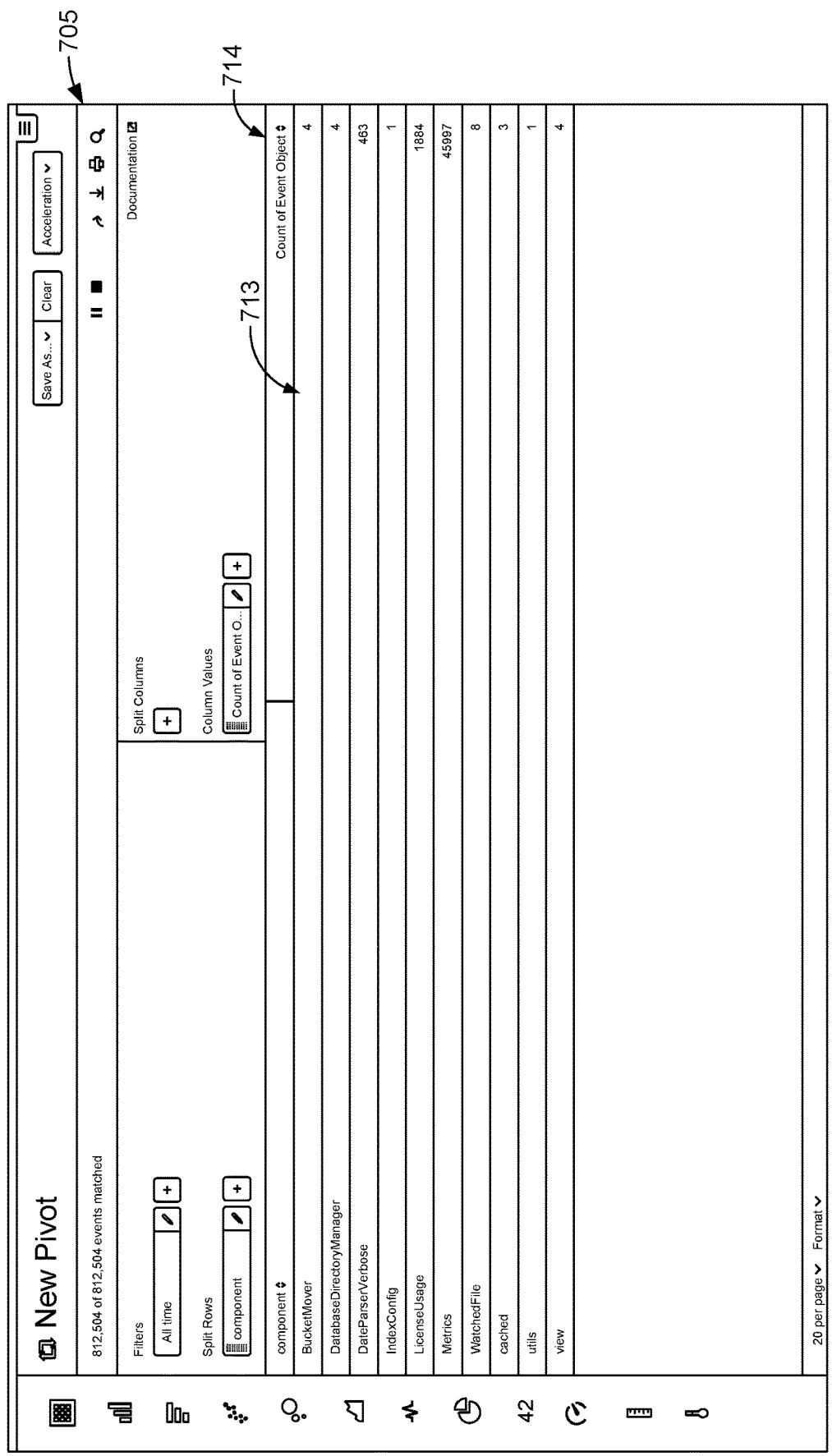

FIG. 7D illustrates an example graphical user interface screen 705 including a table of results 713 based on the selected criteria including splitting the rows by the "component" field. A column 714 having an associated count for each component listed in the table may be displayed that indicates an aggregate count of the number of times that the particular field-value pair (e.g., the value in a row) occurs in the set of events responsive to the initial search query.

Figure 14:
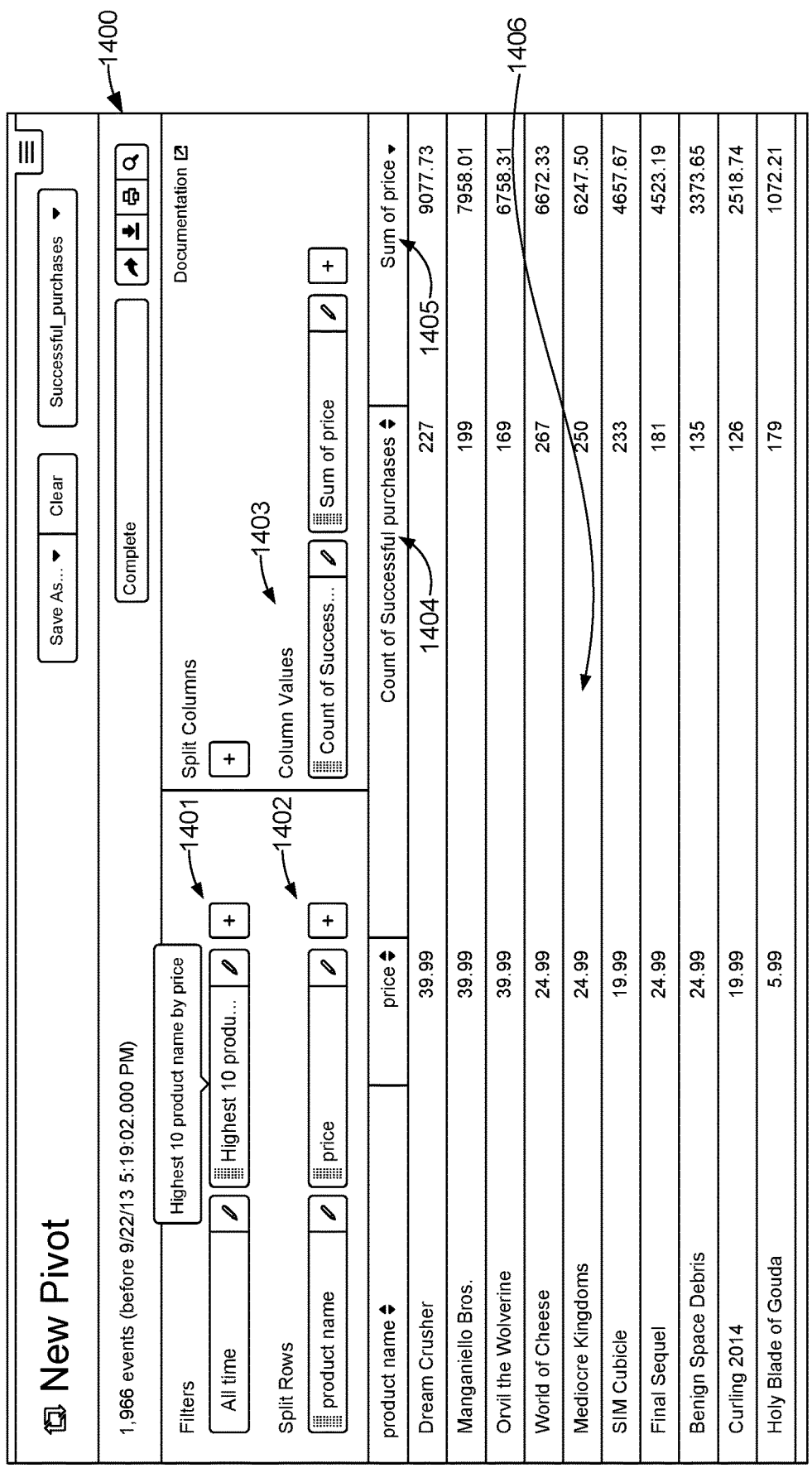

FIG. 14 illustrates an example graphical user interface screen 1400 that allows the user to filter search results and to perform statistical analysis on values extracted from specific fields in the set of events. In this example, the top ten product names ranked by price are selected as a filter 1401 that causes the display of the ten most popular products sorted by price. Each row is displayed by product name and price 1402. This results in each product displayed in a column labeled "product name" along with an associated price in a column labeled "price" 1406. Statistical analysis of other fields in the events associated with the ten most popular products have been specified as column values 1403. A count of the number of successful purchases for each product is displayed in column 1404. This statistics may be produced by filtering the search results by the product name, finding all occurrences of a successful purchase in a field within the events and generating a total of the number of occurrences. A sum of the total sales is displayed in column 1405, which is a result of the multiplication of the price and the number of successful purchases for each product.

Figure 15:
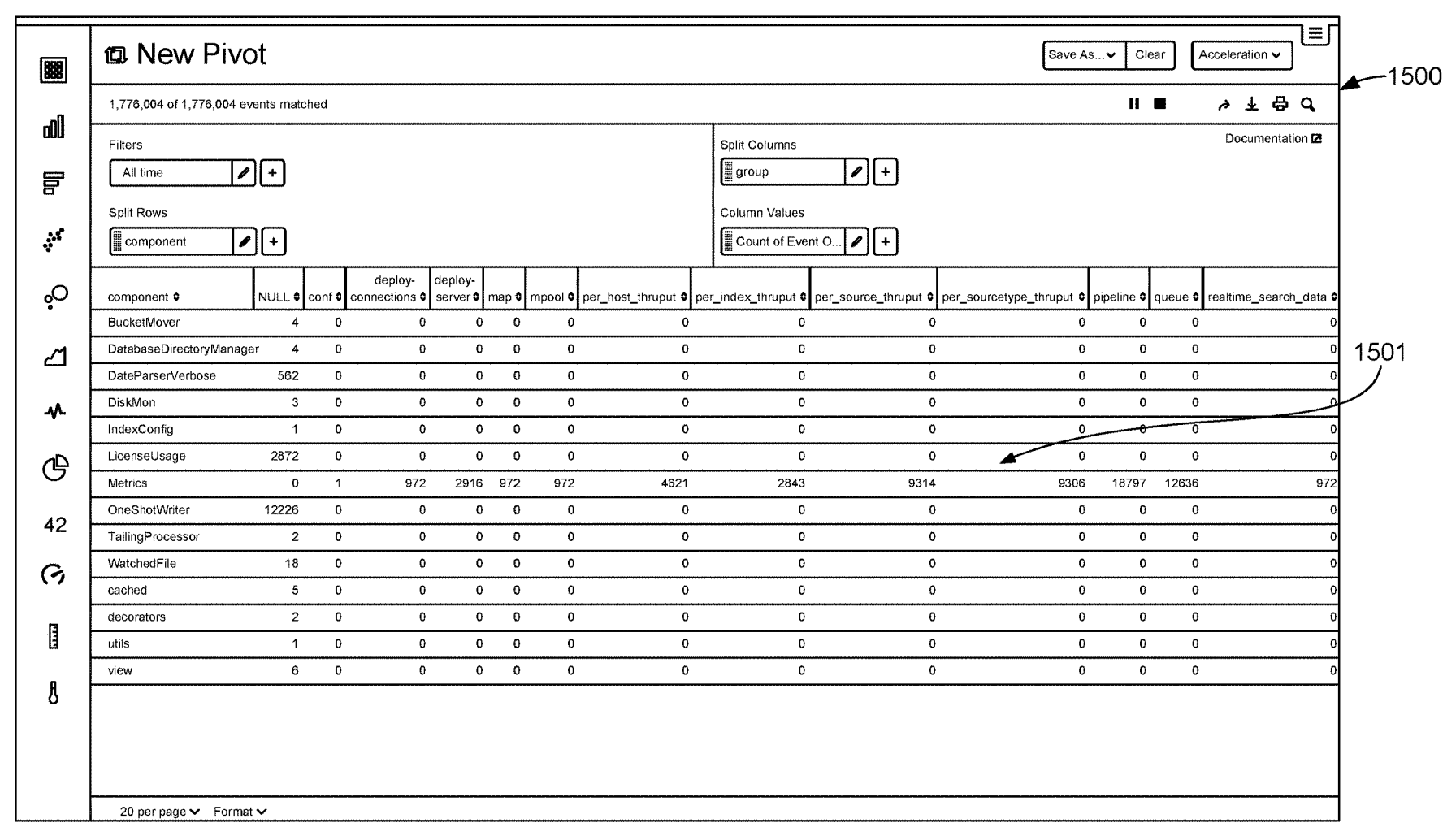
Figure 16:
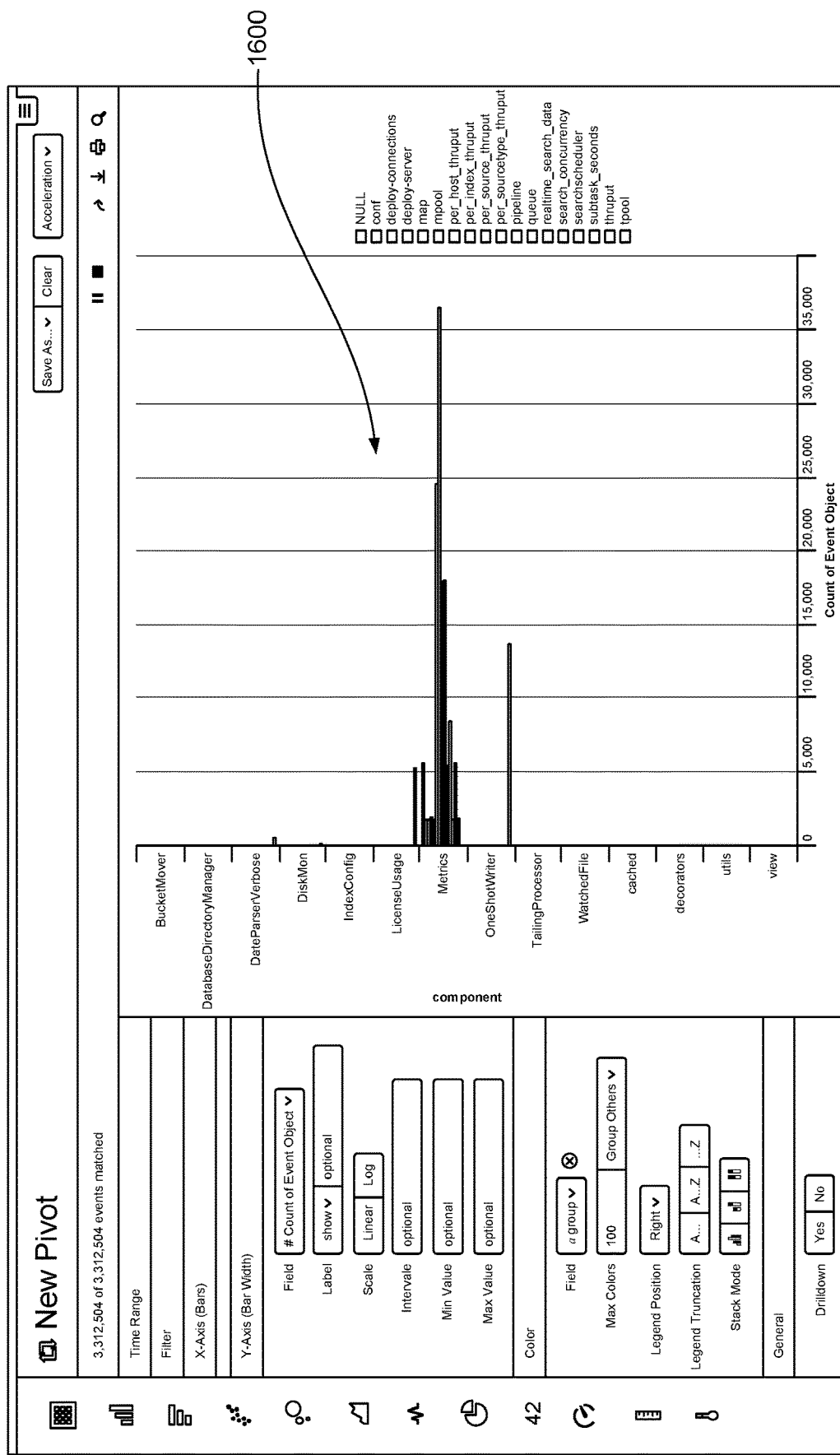
Figure 17:
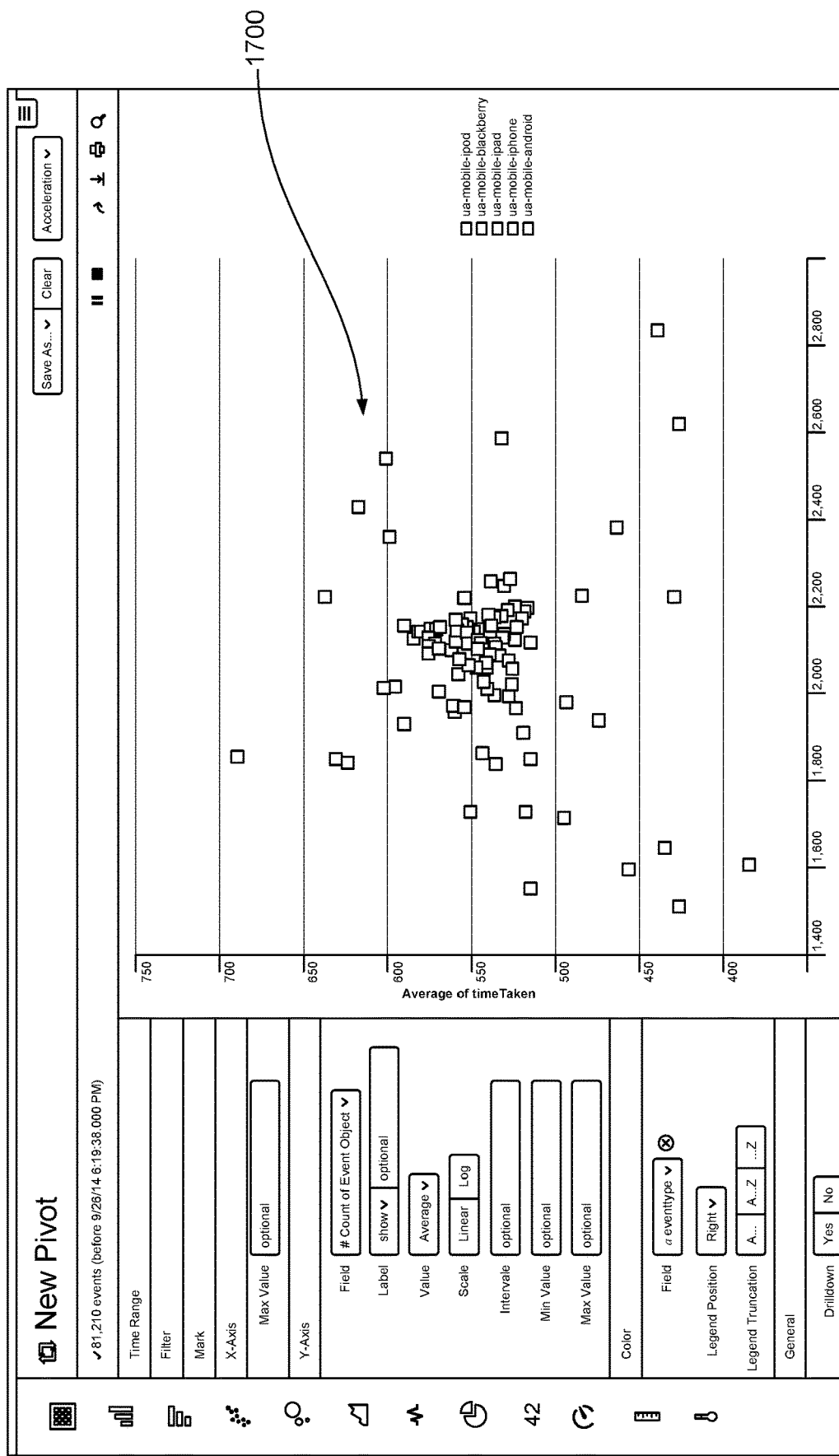

The reporting application allows the user to create graphical visualizations of the statistics generated for a report. For example, FIG. 15 illustrates an example graphical user interface 1500 that displays a set of components and associated statistics 1501. The reporting application allows the user to select a visualization of the statistics in a graph (e.g., bar chart, scatter plot, area chart, line chart, pie chart, radial gauge, marker gauge, filler gauge, etc.). FIG. 16 illustrates an example of a bar chart visualization 1600 of an aspect of the statistical data 1501. FIG. 17 illustrates a scatter plot visualization 1700 of an aspect of the statistical data 1501.

2.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.10.1. Aggregation Technique

Figure 8:
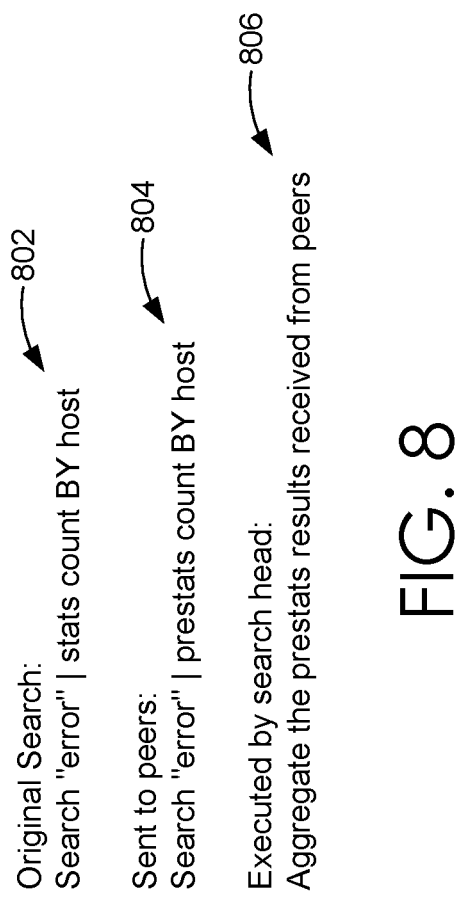
FIG. 8 illustrates an example search query received from a client and executed by search peers in accordance with the disclosed embodiments.

To facilitate faster query processing, a query can be structured such that multiple indexers perform the query in parallel, while aggregation of search results from the multiple indexers is performed locally at the search head. For example, FIG. 8 illustrates how a search query 802 received from a client at a search head 210 can split into two phases, including: (1) subtasks 804 (e.g., data retrieval or simple filtering) that may be performed in parallel by indexers 206 for execution, and (2) a search results aggregation operation 806 to be executed by the search head when the results are ultimately collected from the indexers.

During operation, upon receiving search query 802, a search head 210 determines that a portion of the operations involved with the search query may be performed locally by the search head. The search head modifies search query 802 by substituting "stats" (create aggregate statistics over results sets received from the indexers at the search head) with "prestats" (create statistics by the indexer from local results set) to produce search query 804, and then distributes search query 804 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 806 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 9A:
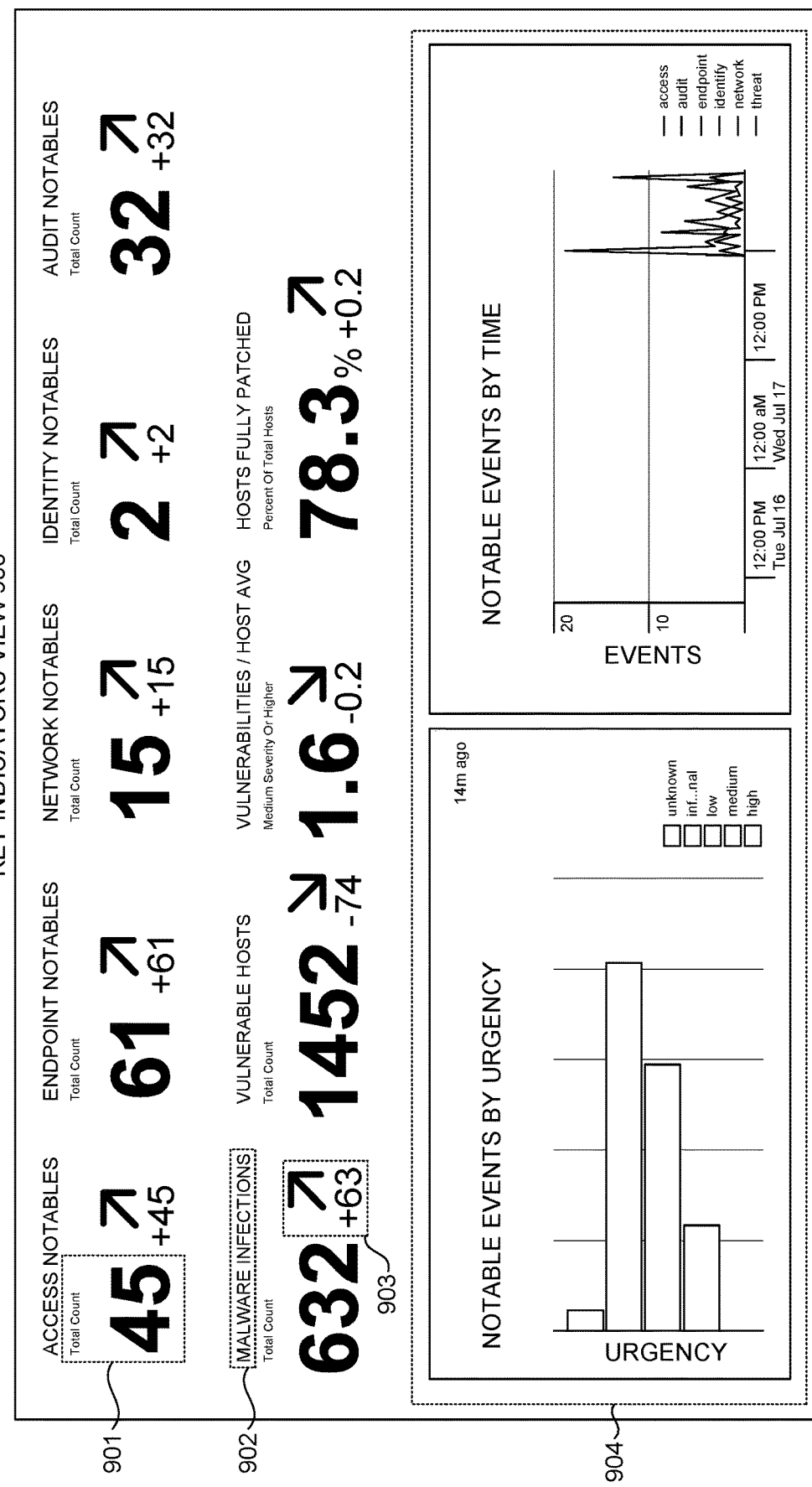
FIG. 9A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics, such as counts of different types of notable events. For example, FIG. 9A illustrates an example key indicators view 900 that comprises a dashboard, which can display a value 901, for various security-related metrics, such as malware infections 902. It can also display a change in a metric value 903, which indicates that the number of malware infections increased by 63 during the preceding interval. Key indicators view 900 additionally displays a histogram panel 904 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 9B illustrates an example incident review dashboard 910 that includes a set of incident attribute fields 911 that, for example, enables a user to specify a time range field 912 for the displayed events. It also includes a timeline 913 that graphically illustrates the number of incidents that occurred in time intervals over the selected time range. It additionally displays an events list 914 that enables a user to view a list of all of the notable events that match the criteria in the incident attributes fields 911. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Data Center Monitoring

As mentioned above, the SPLUNK® ENTERPRISE platform provides various features that simplify the developer's task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

Figure 9C:
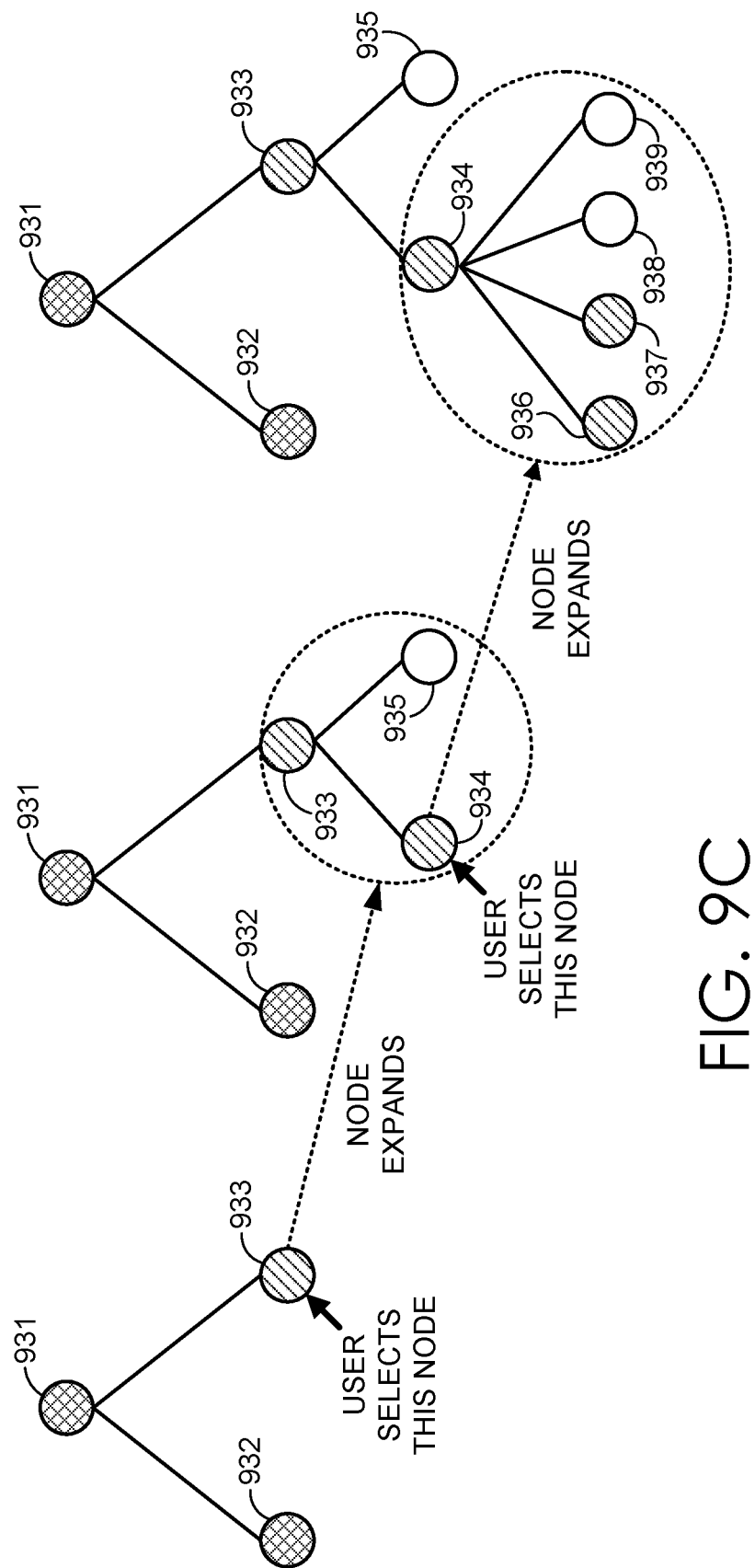
FIG. 9C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 9C, wherein nodes 933 and 934 are selectively expanded. Note that nodes 931-939 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/253,490, entitled "PROACTIVE MONITORING TREE WITH SEVERITY STATE SORTING", filed on 15 Apr. 2014, and U.S. patent application Ser. No. 14/812,948, also entitled "PROACTIVE MONITORING TREE WITH SEVERITY STATE SORTING", filed on 29 Jul. 2015, each of which is hereby incorporated by reference in its entirety for all purposes.

Figure 9D:
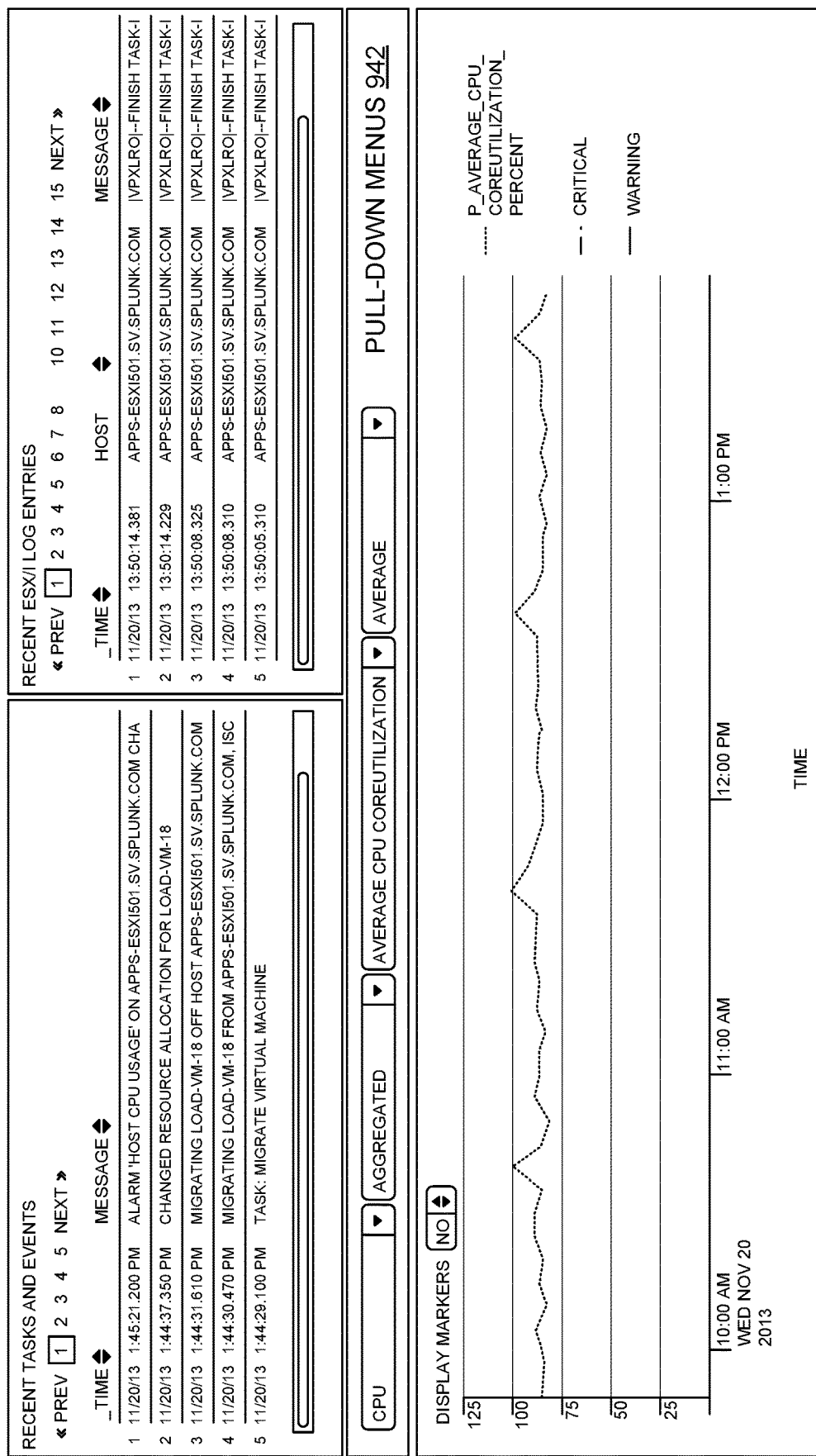
FIG. 9D illustrates a user interface screen displaying both log data and performance data in accordance with the disclosed embodiments.

The SPLUNK® APP FOR VMWARE® also provides a user interface that enables a user to select a specific time range and then view heterogeneous data comprising events, log data, and associated performance metrics for the selected time range. For example, the screen illustrated in FIG. 9D displays a listing of recent "tasks and events" and a listing of recent "log entries" for a selected time range above a performance-metric graph for "average CPU core utilization" for the selected time range. Note that a user is able to operate pull-down menus 942 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.13. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 10:
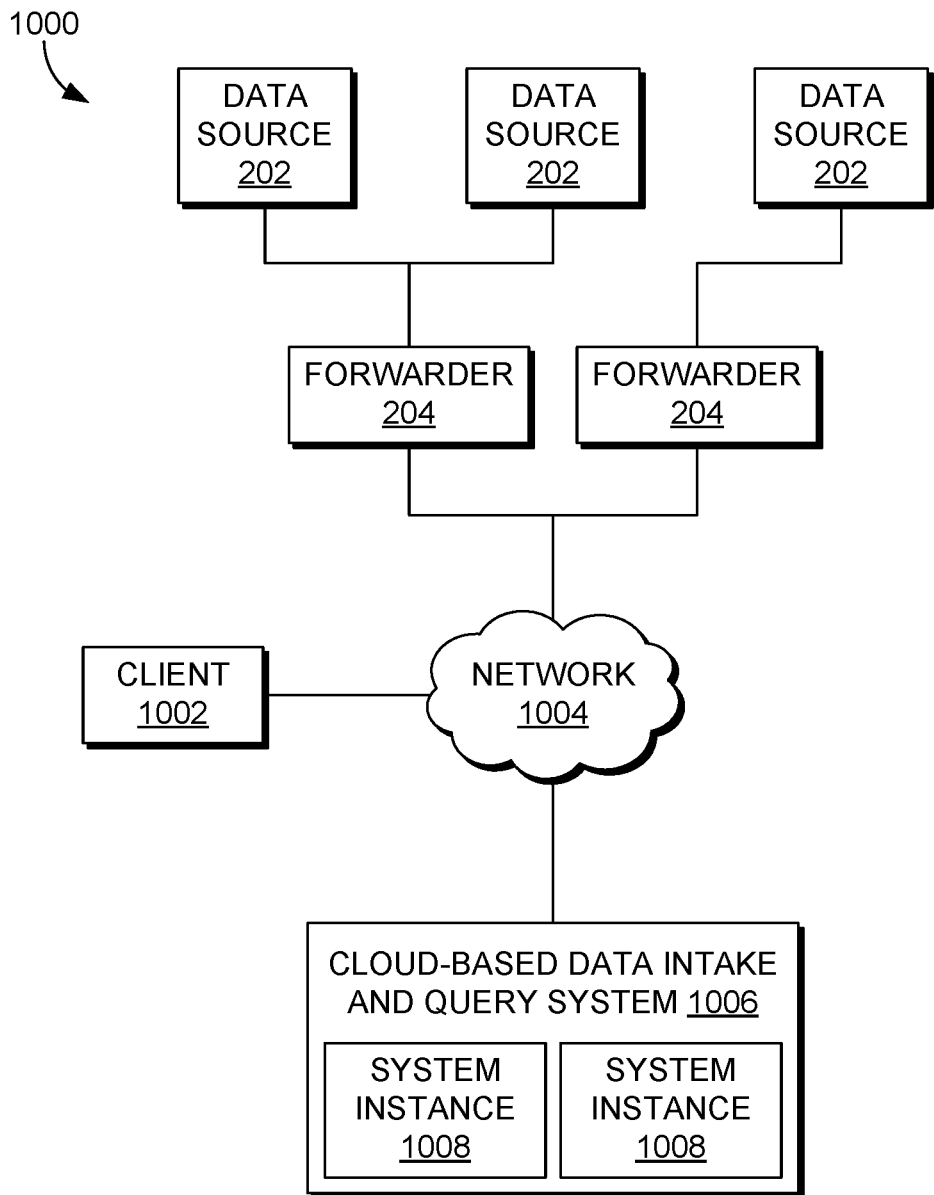
FIG. 10 illustrates a block diagram of an example cloud-based data intake and query system in which an embodiment may be implemented.

FIG. 10 illustrates a block diagram of an example cloud-based data intake and query system. Similar to the system of FIG. 2, the networked computer system 1000 includes input data sources 202 and forwarders 204. These input data sources and forwarders may be in a subscriber's private computing environment. Alternatively, they might be directly managed by the service provider as part of the cloud service. In the example system 1000, one or more forwarders 204 and client devices 1002 are coupled to a cloud-based data intake and query system 1006 via one or more networks 1004. Network 1004 broadly represents one or more LANs, WANs, cellular networks, intranetworks, internetworks, etc., using any of wired, wireless, terrestrial microwave, satellite links, etc., and may include the public Internet, and is used by client devices 1002 and forwarders 204 to access the system 1006. Similar to the system of 108, each of the forwarders 204 may be configured to receive data from an input source and to forward the data to other components of the system 1006 for further processing.

In an embodiment, a cloud-based data intake and query system 1006 may comprise a plurality of system instances 1008. In general, each system instance 1008 may include one or more computing resources managed by a provider of the cloud-based system 1006 made available to a particular subscriber. The computing resources comprising a system instance 1008 may, for example, include one or more servers or other devices configured to implement one or more forwarders, indexers, search heads, and other components of a data intake and query system, similar to system 108. As indicated above, a subscriber may use a web browser or other application of a client device 1002 to access a web portal or other interface that enables the subscriber to configure an instance 1008.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 1008) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.14. Searching Externally Archived Data

Figure 11:
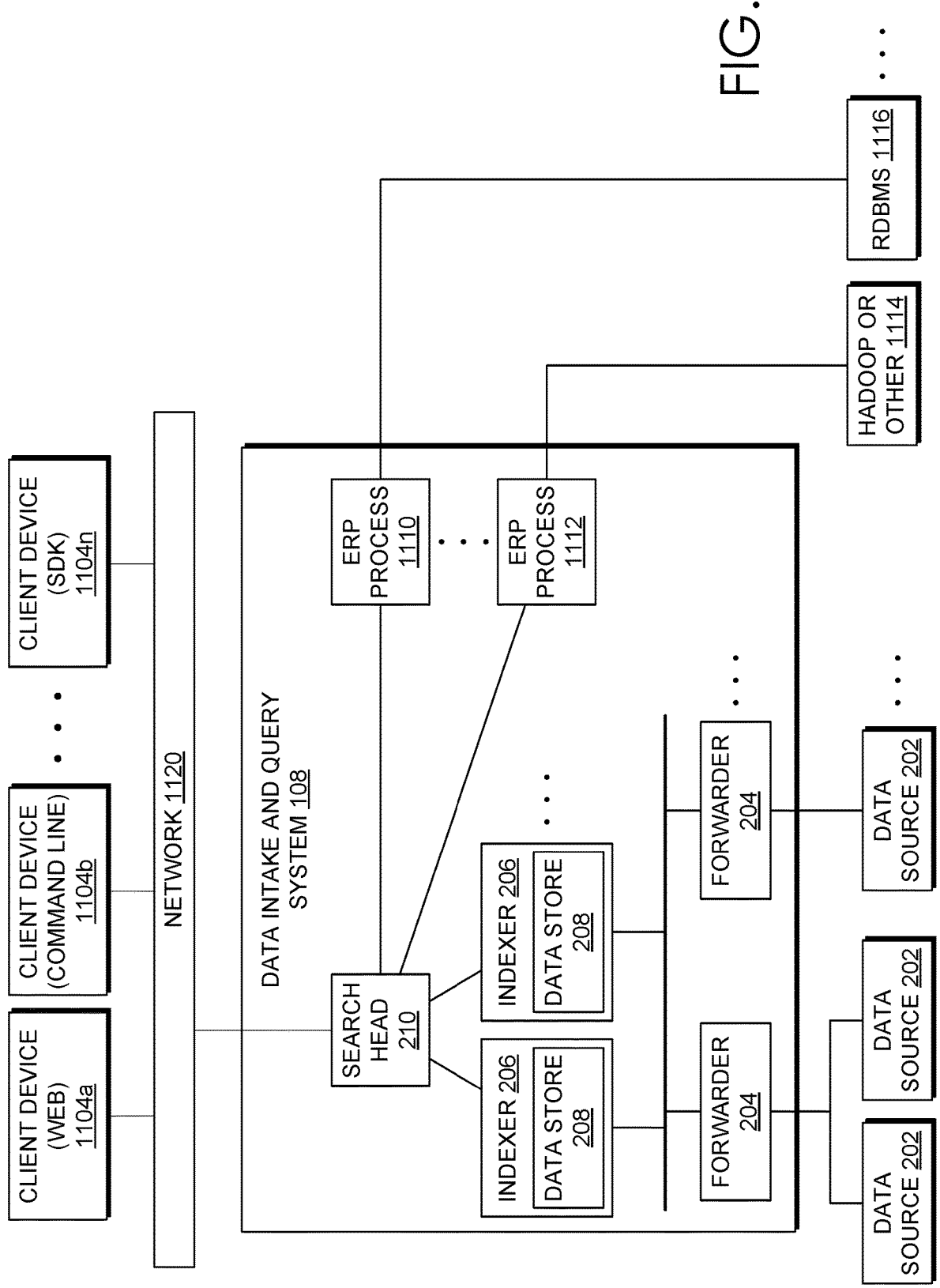
FIG. 11 illustrates a block diagram of an example data intake and query system that performs searches across external data systems in accordance with the disclosed embodiments.

FIG. 11 shows a block diagram of an example of a data intake and query system 108 that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 210 of the data intake and query system receives search requests from one or more client devices 1104 over network connections 1120. As discussed above, the data intake and query system 108 may reside in an enterprise location, in the cloud, etc. FIG. 11 illustrates that multiple client devices 1104a, 1104b, . . . , 1104n may communicate with the data intake and query system 108. The client devices 1104 may communicate with the data intake and query system using a variety of connections. For example, one client device in FIG. 11 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1104 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1110. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 1110, 1112.

FIG. 11 shows two ERP processes 1110, 1112 that connect to respective remote (external) virtual indices, which are indicated as a Hadoop or another system 1114 (e.g., Amazon S3, Amazon EMR, other Hadoop Compatible File Systems (HCFS), etc.) and a relational database management system (RDBMS) 1116. Other virtual indices may include other file organizations and protocols, such as Structured Query Language (SQL) and the like. The ellipses between the ERP processes 1110, 1112 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1110, 1112 receive a search request from the search head 210. The search head may optimize the received search request for execution at the respective external virtual index. Alternatively, the ERP process may receive a search request as a result of analysis performed by the search head or by a different system process. The ERP processes 1110, 1112 can communicate with the search head 210 via conventional input/output routines (e.g., standard in/standard out, etc.). In this way, the ERP process receives the search request from a client device such that the search request may be efficiently executed at the corresponding external virtual index.

The ERP processes 1110, 1112 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1110, 1112 generate appropriate search requests in the protocol and syntax of the respective virtual indices 1114, 1116, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 1104 may communicate with the data intake and query system 108 through a network interface 1120, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.14.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.15. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

3.0 Event Clustering

As indicated above, in various implementations, underlying raw data is maintained for events. This allows users and the system to continue to investigate and learn valuable insights about the raw data. For example, the raw data of different events may include latent similarities, which can facilitate additional understanding of the events. These similarities can be leveraged in various ways, such as to determine that certain events correspond to the same data type, share the same schema, or otherwise have similar structure. As additional examples, these similarities can be leveraged to assist users in identifying fields in event raw data, develop extraction rules for the fields, apply schema to events, and validate any combination of the foregoing.

As described herein, events can be clustered, or arranged into groups, based on the similarity between any of the various data assigned to the events, such as the raw data or other underlying data of the event. In this regard, events can be detected as similar, and thereby clustered when data assigned to the events are similar.

Various approaches to clustering may be employed, such as those based on cluster analysis, similarity scoring, difference scoring, or the like. In some embodiments, statistical classification, including supervised and unsupervised learning approaches, may be utilized. In unsupervised learning methods, any one of a number of cluster analysis techniques may be employed alone or in combination, including connectivity-based clustering, centroid-based clustering, distribution-based clustering, density-based clustering, canopy clustering, K-means clustering, subspace clustering, and correlation clustering, for example.

3.1 Event Clustering Based on Extraction Rules

In various implementations, the present disclosure provides for applying extraction rules to the clustering of events. The extraction rules can be used to extract information from event data, which can be factored into clustering algorithms, such as those based on any of the various approaches described above. For example, by applying one or more extraction rules for a field to a set of events, portions of event data that are latently similar (e.g., values in different events corresponding to the same field) can be identified to improve the clustering of the events.

For simplicity, the present application may only refer to a particular extraction rule in association with a field. However, it is noted that a field may be defined by one or more extraction rules and where the application refers to an extraction rule for a field in the singular, it should be interpreted as potentially applying to multiple extraction rules (e.g., each extraction rule associated with the field).

In some embodiments, clustering based on an extraction rule(s) for a field includes applying the extraction rule to a set of events to identify values for the field in the events. A clustering algorithm that determines how to cluster events can base its notion of similarity between events on the identified values. To this end, the values identified by the extraction rule can be used to determine the similarity between events such that similar events can be clustered together. This could include increasing the similarity between events based on the identified values so that events are more likely to be clustered into the same group. In some cases, this includes increasing a similarity score for events based on the identified values. For example, the algorithm could increase a similarity score for an event based on the event including values for the field corresponding to the extraction rule. However, as described in more detail below, some embodiments do not require a scoring system to base the similarity of events on the identified values.

In some cases, values for a field are masked from event data, and the events are clustered based on determining the similarity between the masked event data. Masked event data generally refers to event data altered based on values identified in the event data. Masking event data for events can include, for example, deleting identified values for a field from the event data of each event. In addition, or instead, masking event data for events can include assigning a token to identified values for a field from the event data of each event (e.g., replacing the identified value with the token). To this effect, the clustering algorithm can consider identified values in different events as similar or more similar based on each value being assigned the token. For example, assigning a token to an identified value may cause the algorithm to analyze the token in place of the particular value. Each field can be associated with at least one token (e.g., a different token for each field) that is assigned to each identified value corresponding to the field. In one approach, the token for a field corresponds to the field name for the field.

As mentioned above, some embodiments do not require a scoring system to base the similarity on identified values from one or more extraction rules. Some of these embodiments may only consider events similar where event data analyzed for the events are identical amongst the events (optionally after some parsing, cleaning, and/or tokenization). Similar events may be grouped together, such that each group represents unique event data. In some embodiments, the event data analyzed for events can be or comprise the masked event data described above. Masking different values from event data of different events, for example can result in those values being considered as identical. In this way, applying an extraction rule can result in the clustering algorithm identifying additional events as identical, or otherwise similar, even where the events have different values for fields. An example of the forgoing will later be described in additional detail with respect to FIGS. 18A-18G.

It should be appreciated that rather than grouping events together based on identical event data, masked or otherwise, in some cases, similarity scores between events could be determined based on analyzing the identified values for fields (e.g., based on determining similarity between tokens, or the values themselves), and events may be grouped based on the similarity scores. The identified values can be factored into any of the various clustering approaches described herein including those that employ statistical classification.

3.2 Types of Extraction Rules Applied to Clustering

The extraction rules for fields applied to clustering can come from any combination of a variety of possible sources. In some cases, one or more of the extraction rules are machine-generated. For example, an extraction rule may be automatically generated by the system based on an analysis of one or more events. For example, an extraction rule may be generated by offering the user options for the extraction rule and the extraction rule may be automatically machine-generated based on the selected options. In addition or instead, the user may select the one or more events and/or one or more portions of the underlying data thereof for the system to base the extraction rule generation on. One or more extraction rules can also be user generated. For example, a user may type in or otherwise define an extraction rule. In some cases, one or more extraction rules are partially machine-generated and partially user generated. For example, a user could modify a machine-generated extraction rule and/or draft one or more portions thereof.

One or more of the extraction rules can correspond to a field defined prior to search time. These can include metadata fields of the events, such as "default fields" that may be associated with all events, as described above. In some cases, these metadata fields are extracted at index time by an indexer and may also include one more custom fields as defined by a user. Examples of default metadata fields associated with each event include a host, source, and source type field including or in addition to a field storing the timestamp.

In addition or instead, one or more of the extraction rules can correspond to a field defined after index time of events, such as at search time. For example, the field may be defined in association with a search interface, which may correspond to search screen 600 of FIG. 6A, or another interface. As an example, a user may provide an extraction rule that defines a field to a loaded search interface corresponding to search screen 600. The search screen can be updated to reflect the newly defined field, such as by updating displayed events in the search screen to display values for the field (e.g., in events list 608) and/or including the field in fields sidebar 606. In this case, the newly defined field may be extracted from the events corresponding to the search query and values of the field may be displayed in association with the events.

It should be noted that aspects of the present disclosure extend beyond systems that perform searches on indexed events and more generally can apply to systems that define extraction rules for events at any time, regardless of whether the system performs indexing or employs a search interface. Further, the extraction rules can more generally be applied to the underlying data of events, which is not necessarily raw data.

In various implementations, regardless of when an extraction rule(s) has been generated, and regardless of whether the extraction rule has been assigned to a field, events can be clustered based on the extraction rule. Further, in some cases, at least some of the events can be reclustered or clusters can be updated based on the extraction rule. Thus, as new extraction rules are generated in association with events, a set of clusters corresponding to those events can also be updated to reflect any insights that may be provided by the new extraction rules.

3.3 Interactive Field Generator

In some respects, the present application provides for clustering events based on extraction rules in order to assist a user in defining extraction rules for event fields. In particular, the relationships between events that are represented by clusters can be exposed to users to aid in the users understanding and interpreting the events.

In some embodiments, this is manifested by displaying one or more clusters of a set of clusters to the user in association with a set of events. An extraction rule can be generated in association with the displayed events. In response to the extraction rule being generated, a new set of clusters is determined based on the extraction rule, and one or more clusters of the new set of clusters is displayed to the user. In this way, the system can indicate to the user the impact of the extraction rule on underlying relationships between events. Based on the displayed clusters from the new set, the user can choose to modify the extraction rule, assign the extraction rule to a field, and/or generate at least one additional extraction rule for the field or another field.

In some embodiments, the extraction rules (and optionally fields) are iteratively generated using this approach, and each time events are clustered, any newly generated extraction rules can be added to the extraction rules applied to the clustering. Each additional extraction rule may in some cases increase the similarity between events in the clustering algorithm, such that the number of clusters might be reduced.

FIGS. 18A-18G illustrate one approach to interactive field generation, in accordance with implementations of the present disclosure. Below, additional aspects of the present disclosure are described with respect to field generation interface 1800. However, field generation interface is used for illustrative purposes and many of the features of field generation interface 1800 can vary such as presentation formats for data, workflow, and the like. FIGS. 18A-18G are in temporal order, however, other intermediate screens could be employed.

Field generation interface 1800 allows a user to interactively define new event fields by generating extraction rules and assigning the extraction rules to fields. As indicated above, the field generation interface may optionally be launched from a search interface, such as one corresponding to search screen 600, or another suitable search interface. It is noted that field generation interface 1800 could be implemented at or prior to search time for events and could be employed outside of the context of search systems. In some cases, a search interface (e.g., corresponding to search screen 600) displays a selectable option, which when selected by the user, causes field generation interface 1800 to be launched, which can optionally result in display of source selection form 1802 shown in FIG. 18A.

By way of example, source selection form 1802 allows the user to select one or more source types. A user may type a source type into source selection form 1802 to select a source type and/or select one or more source types from a menu, as shown. For the present example, assume the user selects source type 1804 labeled "alcatel." In some implementations, the selected source type(s) define the events utilized by field generation interface 1800 to assist the user in generating extraction rules. In particular, field generation interface 1800 can display events corresponding to the selected source type and/or base extraction rule generation on the underlying data of the events, such as for machine-generated extraction rules. In other cases, one or more source types may be automatically selected, such as based on corresponding to a search query in the search interface and/or one or more events returned by the search query. In FIG. 6A, as one example, the source type could correspond to the selected field indicated in fields sidebar 606.

In the present example, based on the selection of a source type, such as source type 1804, the system causes display of one or more events corresponding to the source type, as shown in FIG. 18B. For example, the events may be displayed based on having a source type field that matches or otherwise corresponds to the selected source type. Optionally, the system clusters the events, and the events and one or more of the clusters are presented to the user, as shown in FIG. 18B. In this case, the system has identified forty-eight clusters from one-thousand events corresponding to the selected source type. A subset of the clusters (eight clusters) is shown and optionally additional clusters could be exposed via user interaction with field generation interface 1800 (e.g., via scrolling in response to user input). This subset includes clusters 1806A, 1806B, 1806C, 1806D, 1806E, 1806F, 1806G, and 1806H (referred to collectively as clusters 1806), which are each visually indicated in the figure by a corresponding event. In the present example, clusters 1806 are presented in a manner that visually distinguishes the clusters. Each cluster corresponds to a respective row. Further, an event from the cluster is presented in association with the cluster (e.g., the underlying data of the event). Although a single event from each cluster is displayed, in other cases multiple events could be displayed in association with each cluster. Further, more events from a cluster could be exposed based on a user selection corresponding to the cluster.

In the present example, the set of clusters for FIG. 18B is based on fields assigned to the events (e.g., prior to launching field generation interface 1800). In this case, the events have been clustered based on at least one default field assigned to the events. In particular, the events have been clustered based on a field(s) corresponding to the time stamp (e.g., using one or more extraction rules corresponding to the time stamp) of the event. The system has identified values in the events corresponding to the time stamp, has masked out the identified values, and has clustered the events using the masked event data. As a specific example, for FIG. 18B, the masked out portion of each event comprising the time stamp can be "<<TIME>><<NUM>><<NUM>><<NUM>><<NUM>>," where the five values of the time stamp have been tokenized. Thus, for clustering, the masked event data for the event corresponding to cluster 1806A shown in FIG. 18B could be "<<TIME>><<NUM>><<NUM>><<NUM>><<NUM>>% LINK-I-Up: e13" and the masked event data for the event corresponding to cluster 1806G shown in FIG. 18B could be "<<TIME>><<NUM>><<NUM>><<NUM>><<NUM>>% LINK-I-Up: e14."

The clustering algorithm used in the present example groups events by identical matches between event data, as described above. Thus, using masked event data, events with different time stamp values can be identified as corresponding to the same cluster. The unmasked portion of the event data can be used to define the clusters. Thus, in this case, each event of a particular cluster includes the same unmasked portion of event data, but might include a different time stamp. As noted above, in other approaches a similarity score could be determined using masked event data in order to group events.

As noted above, this is but one suitable approach to clustering the events. It is further noted that the events need not be initially clustered based on a field(s) in FIG. 18B. More generally, one or more of the events corresponding to the selected source type (or otherwise selected to use for extraction rule generation) could be presented to the user. Also, other fields could be considered, such as based on being a selected field in search screen 600. By selecting GUI control element 1814, the user can cause display of FIG. 18C.

In FIG. 18B, the user can select one or more portions of event data from one or more events. As shown, the user has selected portion 1810. The selection portion is visually indicated using text highlighting. Based on the user selection of the event data, the system optionally causes field selection form 1812 to be displayed to the user. The user can enter a field name for a field corresponding to the selected portion(s) of event data.

The selected portion(s) of event data correspond to a sample value(s) for at least one extraction rule. In response to the user providing the sample value(s), the system generates one or more extraction rules corresponding to the sample value(s). For example, the system can generate one or more extraction rules capable of extracting the sample value(s) from the corresponding event data. This can be based on the position of a sample value in event data, the formatting of a sample value, one or more characters in the sample value and/or other factors that can be defined in an extraction rule, such as a regex. Any suitable approach to machine-generating extraction rules based on sample values can be employed.

FIG. 18C displays events along with sample values identified in each event using the machine-generated extraction rule(s) for the field named "type." The identified values for each event are visually indicated by highlighting text in event data corresponding to the values. By selecting GUI control element 1816, the user can accept the machine-generated rule for the field and cause display of FIG. 18D.

The example shown in FIG. 18C corresponds to an extraction rule adjustment interface, which allows the user to modify the machine-generated extraction rule. Examples of such interfaces have been described above. In this case, the extraction rule adjustment interface presents a plurality of selectable options for the extraction rule. Each option is selectable to cause the extraction rule to be replaced with a modified version corresponding to the selection option. Further, the displayed field value indicators (e.g., highlighting) can be updated to correspond to the selected option(s). When the user is satisfied with the current extraction rule, GUI control element 1816 can be selected to apply the extraction rule to the field.

As shown, one or more default options may be selected that correspond to the machine-generated extraction rule(s). In some implementations, the system generates the plurality of options for the extraction rule based on the sample value(s), selects one or more of the options as default options, and generates the initial machine-generated extraction rule having the selected default options. The selection of the options can be based on analyzing each option, such as by scoring and ranking options and/or combinations thereof based on field values extractable using the selection option. For example, the system may determine the default option(s) based on determining the similarity of values extracted using a corresponding extraction rule to the sample value(s) provided by the user. Other factors could include the number of values extractable from a set of events using the option(s).

In the example shown, the system generates options for a plurality of categories (e.g., categories 1820, 1822, and 1824). Further, the system automatically selects an option from each category for the initial extraction rule. As indicated above, the selection can be based on ranking the individual options, and/or combinations thereof (e.g., combinations of one option from each category). By way of example, category 1820 is a "start after" category, with options that define the start after position for the extraction rule (e.g., a regex). These options can define a start position for extracting a value in event data. Category 1822 is an "Extract" category, with options that define content (e.g., characters characters) to extract for the extraction rule (e.g., a regex). Category 1824 is an "End at and not include" category, with options that define the end at position for the extraction rule. These options can define an end position for extracting a value in event data. The options may also specify one or more characters that will not be included in the value, but may define the end position.

As indicated above, the user may select an option from each category of the extraction rule. In addition, or instead, the user may define one or more custom options for the extraction rule. For example, each category includes a custom option, such as custom option 1826, which the user can use to define a corresponding option for that category (e.g., by selecting a corresponding GUI control element). This could include the user providing one or more characters to define the option. In some cases, a custom option allows the user to type in or otherwise provide regex code or one or more portions thereof for the extraction rule. In some cases, an option comprises a predefined common value pattern to include in the exation rule. As an example, a common value pattern could correspond to an IP address format, a credit card #format, a mac address format, or a fully-qualified hostname. An example of a common value pattern for an IP address format is (\d{1-3}\.\d{1-3}\.\d{1-3}\.\d{1-3}), which defines the format of IP addresses.

The extraction rule adjustment interface described above is only one suitable example that may be employed. Also, the extraction rule adjustment interface may include one or more screens and/or windows, although a single screen is shown. In some implementations, an extraction rule adjustment interface is not employed. For example, a machine-generated extraction rule could automatically be generated based on one or more sample values and/or events provided by the user, and applied to clustering. In these cases, the system may, for example, transition to the display of FIG. 18D from FIG. 18B without entering an extraction rule adjustment interface, such as that shown in FIG. 18C.

In response to the new extraction rule, the system can cluster events based on the extraction rule, as indicated in FIG. 18D. In the present example, this clustering is in response to the user accepting the new extraction rule, which can correspond to the user assigning the extraction rule to a field. This may be responsive to selection of GUI control element 1816 in FIG. 18C. FIG. 18D is similar to FIG. 18B, but the screen has been updated based on the new extraction rule(s).

Events can be clustered by adding the new extraction rule(s) to a set comprising any extraction rules that may have been used for a previous clustering of events (e.g., corresponding to FIG. 18B). Further, the clustering algorithm may optionally be the same clustering algorithm utilized for previous clustering. In the present example, the events are reclustered by updating the masked event data to correspond to the new set of extraction rules. This can include tokenizing field values corresponding to the new extraction rule(s) and/or fields. In the example provided for clusters 1806A and 1806G, the updated masked event data could be "<<TIME>><<NUM>><<NUM>><<NUM>><<NUM>> %<type>: e13" and "<<TIME>><<NUM>><<NUM>><<NUM>><<NUM>> %<type>: e14" respectively. As indicated in FIG. 18D, using this approach, the number of clusters of the events has been reduced to 32, as some clusters have been merged. It is noted that the set of extraction rules used for clustering could also be updated based on the user deleting or modifying an extraction rule and/or field from the set in addition to or instead of adding an extraction rule and/or field to the set.

FIG. 18E shows an optional visualization of the reclustering of events, in accordance with some implementations of the present disclosure. In some cases, the user may access the visualization from field generation interface 1800, and the visualization can be updated each time events are reclustered. In the present example, selecting GUI control element 1834 causes visualization 1840 to be displayed to the user.

Visualization 1840 visually indicates relationships between clusters of the events from different sets of clusters. The relationships show a progression of the sets of clusters exposed to the user in field generation interface 1800 (e.g., each set can correspond to a user assigned field and/or extraction rule). In FIG. 18E, the progression is from the set of clusters corresponding to FIG. 18B to the set of clusters corresponding to FIG. 18D. As shown, visualization 1840 indicates that cluster 1842A corresponds to clusters 1806A merged or combined with cluster 1806I. In other words, the events of cluster 1842A comprise the events of each of clusters 1806A and 1806I. Visualization 1840 also indicates that cluster 1842B directly corresponds to cluster 1806B, and cluster 1842C directly corresponds to cluster 1806C. In other words, each event is identical amongst those corresponding clusters or groups. Visualization 1840 also displays event data for each cluster. For the initial set of clusters, the unmasked portion of event data is shown. For the subsequent set of clusters, the unmasked portion of event data is shown, along with at least one token of the masked event data. The token corresponds to the extraction rule(s) added between sets of clusters, thereby indicating the impact of the extraction rule on the clustering.

Returning to FIG. 18D, field generation interface 1800 indicates fields and assigned extraction rules generated using field generation interface 1800. In particular GUI display region 1830 comprises a list of generated fields. Based on the extraction rule being assigned to the field, the field is added to the displayed fields as shown. In particular, entry 1832 corresponds to the field generated for the field named "type." The entry is selectable to delete the field or edit the field. Any number of fields may be shown in GUI display region 1830. In the present example, the fields are selectable and selecting a field causes field values corresponding to the selected fields to be indicated in field generation interface 1800. For example, FIG. 18D shows entry 1832 in a selected state. Deselecting a field and cause field value indicators to be removed from display.

Also shown in FIG. 18D, a user can select sample text values and/or events associated with the clusters similar to what is shown in FIG. 18B. In the example shown, the user has selected portion 1850 of event data causing field selection form 1852 to be displayed. Field selection form 1852 can be similar to field selection form 1812 of FIG. 18B. However, field selection form 1852 presents the user with selectable "add to existing field" option 1854 to assign the extraction rule to an existing field, such as the field named "type," such that the extraction rule generated based on the sample data from the user is assigned to the existing field (e.g., one field may have multiple extraction rules). As another example, adding to an existing field could cause an updated to the original extraction rule corresponding to the field. In this case, an additional extraction rule may not be added to the field, but additional values may be extracted by the updated extraction rule.

Figure 18A:
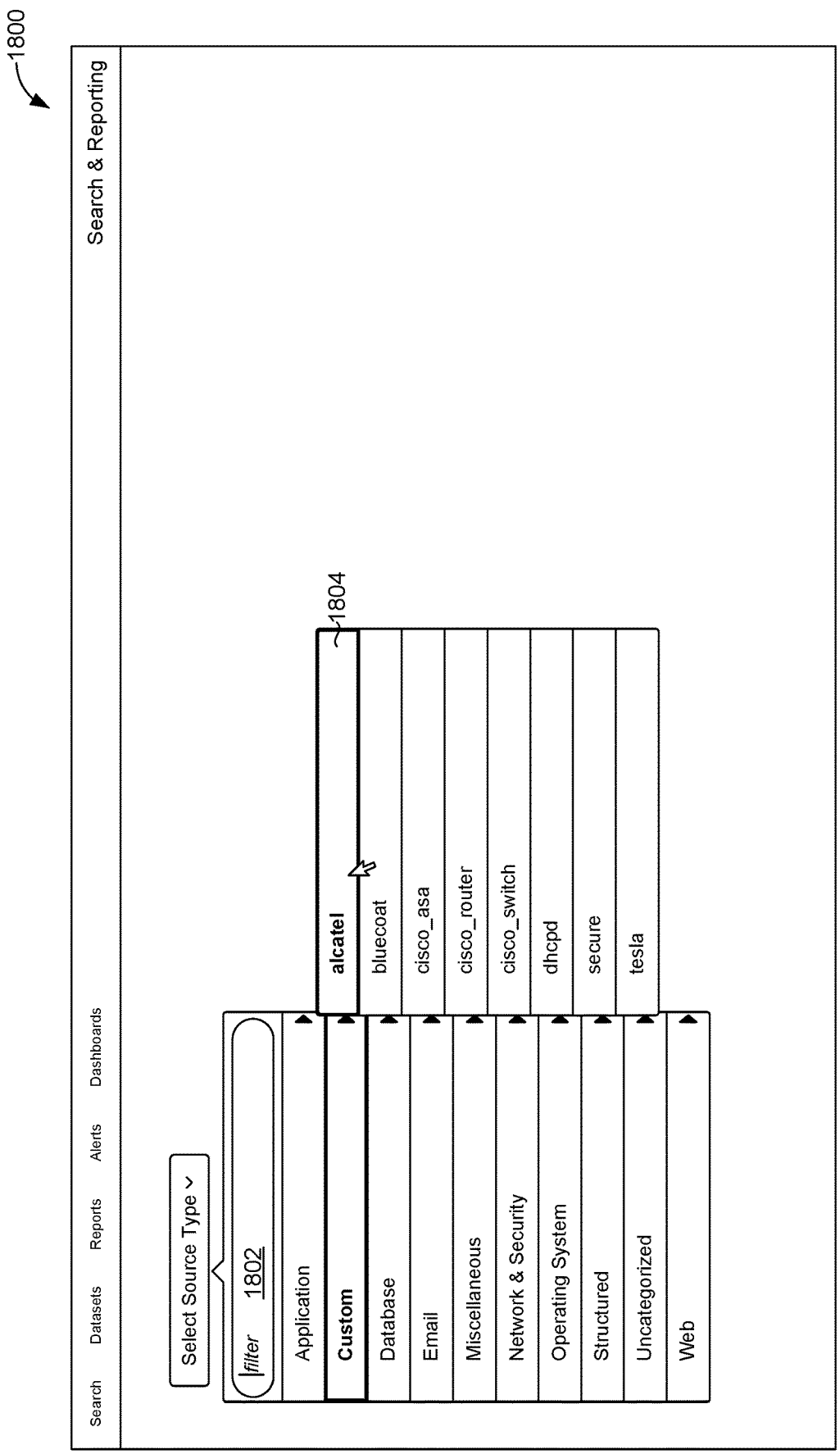
FIG. 18A illustrates an example of a field generation interface in accordance with the disclosed embodiments.
Figure 18C:
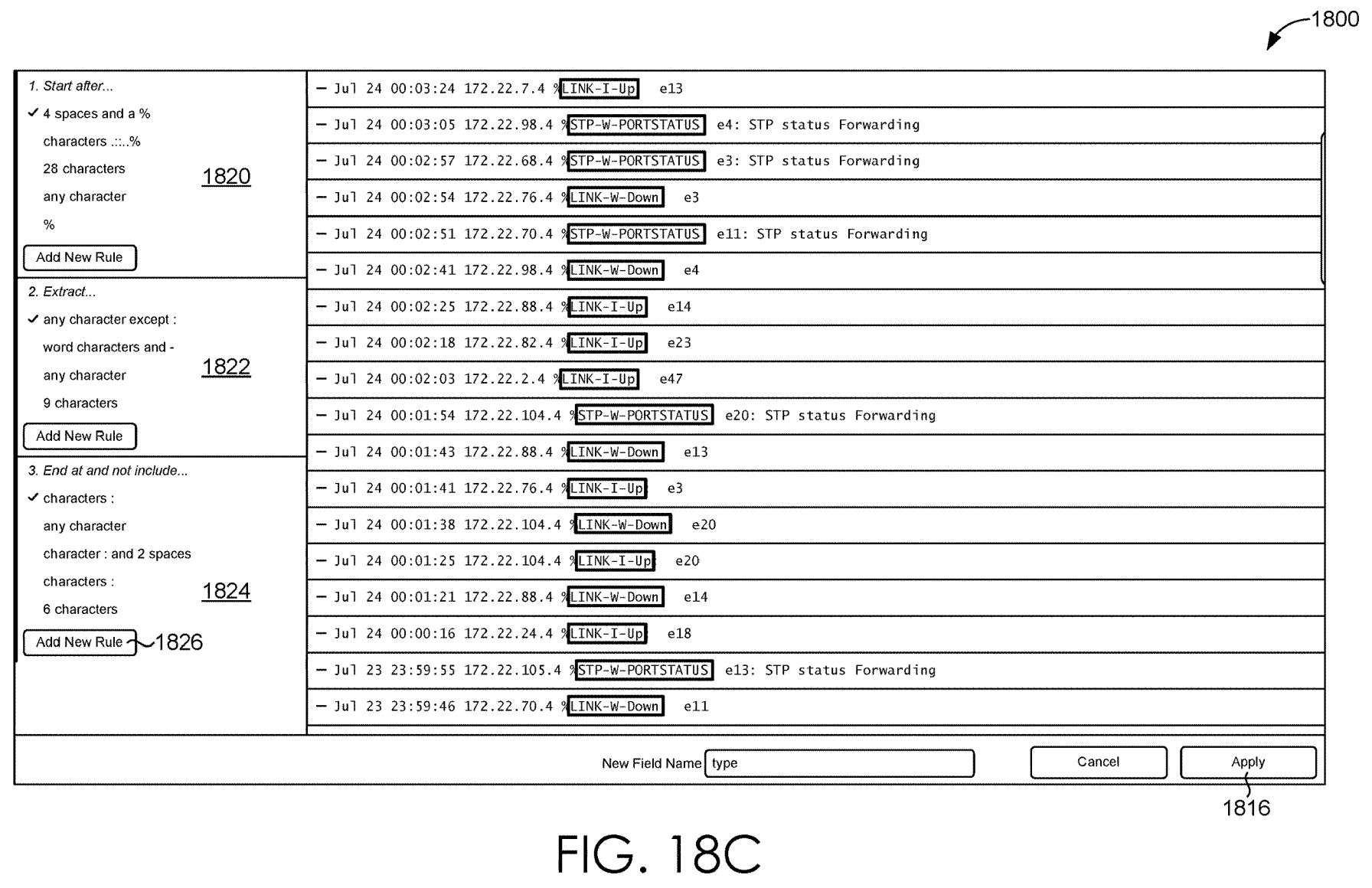
Figure 18E:
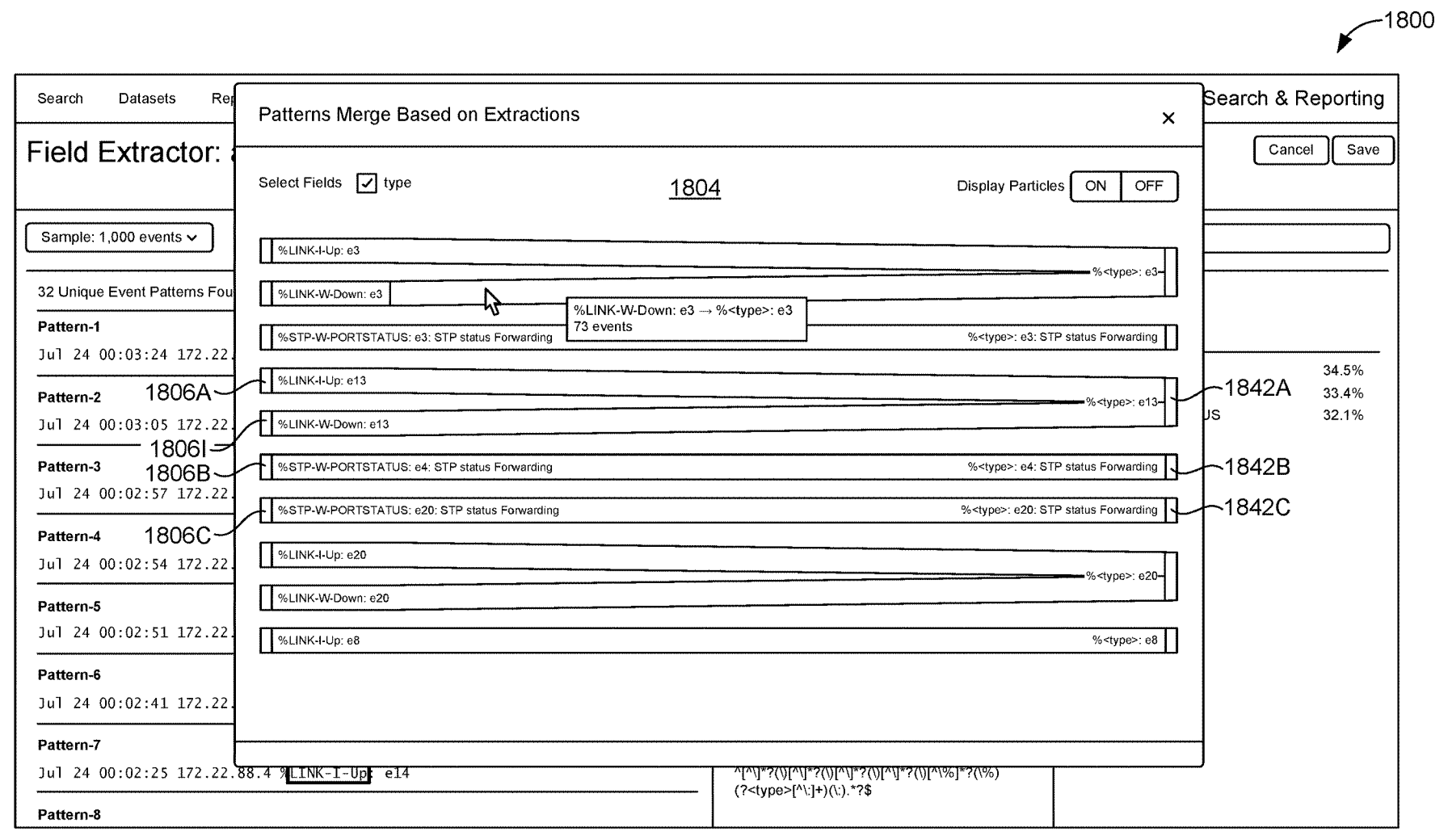
Figure 18F:
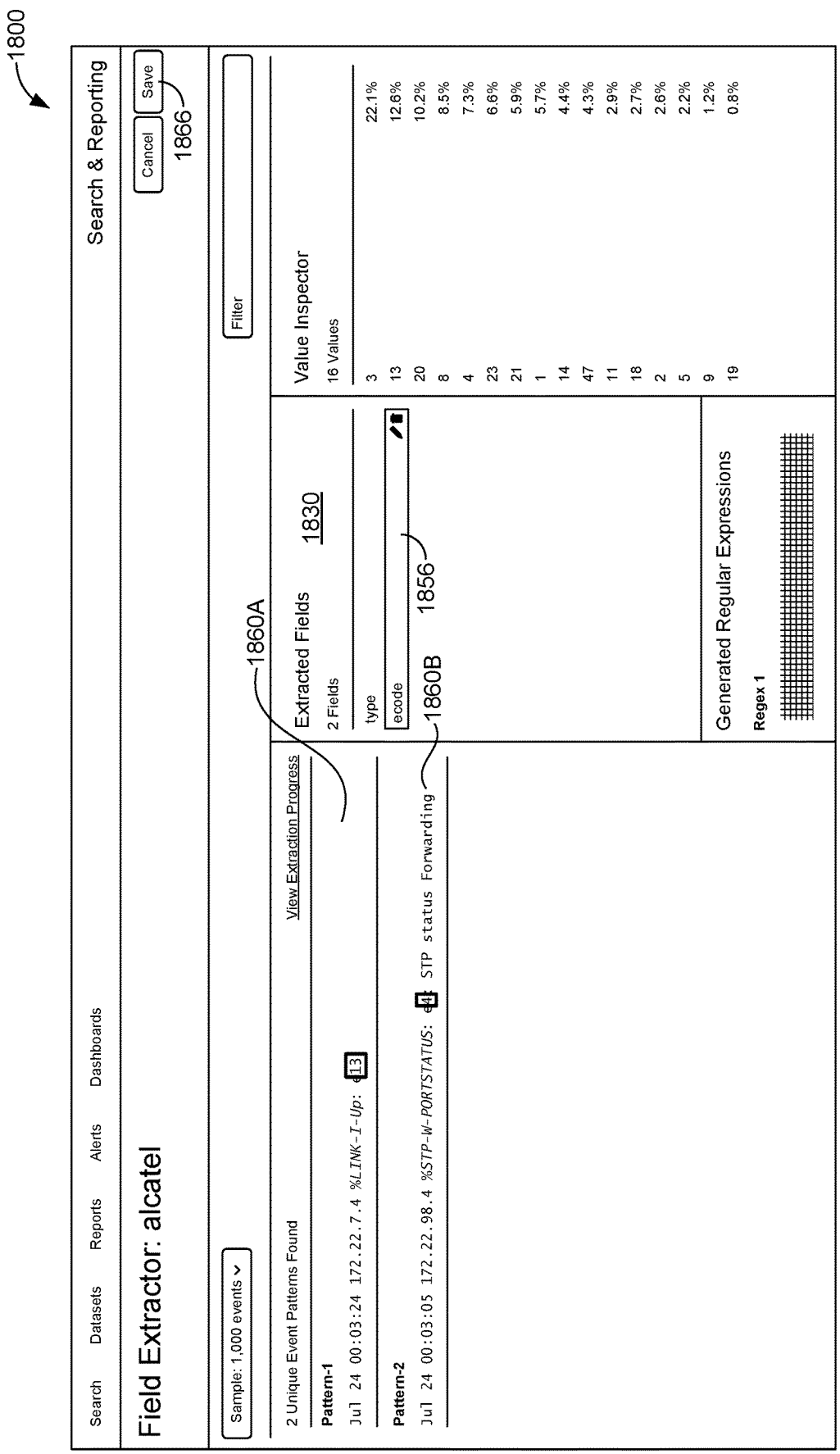
FIG. 18F illustrates an example of a field generation interface in accordance with the disclosed embodiments.

In the present example, assume the user opts to define a new field named "ecode," as shown. A similar extraction rule adjustment interface (not shown) as described with respect to FIG. 18C may be presented based on the selected sample data. As shown in FIG. 18F, the newly generated extraction rule for the field has been generated and assigned to the field causing field entry 1856 to be added to GUI display region 1830 (e.g., a GUI panel). Field entry 1856 is active, causing values corresponding to the field to be identified in event data, as shown. In this case, the values are identified by highlighting their corresponding text in the displayed event data.

Text corresponding to values of inactive or unselected fields is also optionally displayed in a different manner than for active fields. For example, that text may be greyed out, or in some cases not displayed in the event data. Whether text is greyed out, not displayed, or otherwise visually distinguished can be based on the text corresponding to values of fields, regardless of whether the field is active or inactive in field generation interface 1800. For example, each portion of text corresponding to a field may be greyed out or removed from the event data, or otherwise displayed in a manner that allows the user to distinguish between text that has a corresponding field and text that does not. In this way, the users can visually identify which text in event data has yet to be captured by an extraction rule and/or field. As a specific example, for the event corresponding to cluster 1860A, the user may only see "%: e" because that text does not have a corresponding field or extraction rule (e.g., a corresponding field or extraction rule used to form the set of clusters being presented to the user). As another option, the undisplayed text may instead by greyed out or otherwise distinguished from the other text.

Figure 18G:
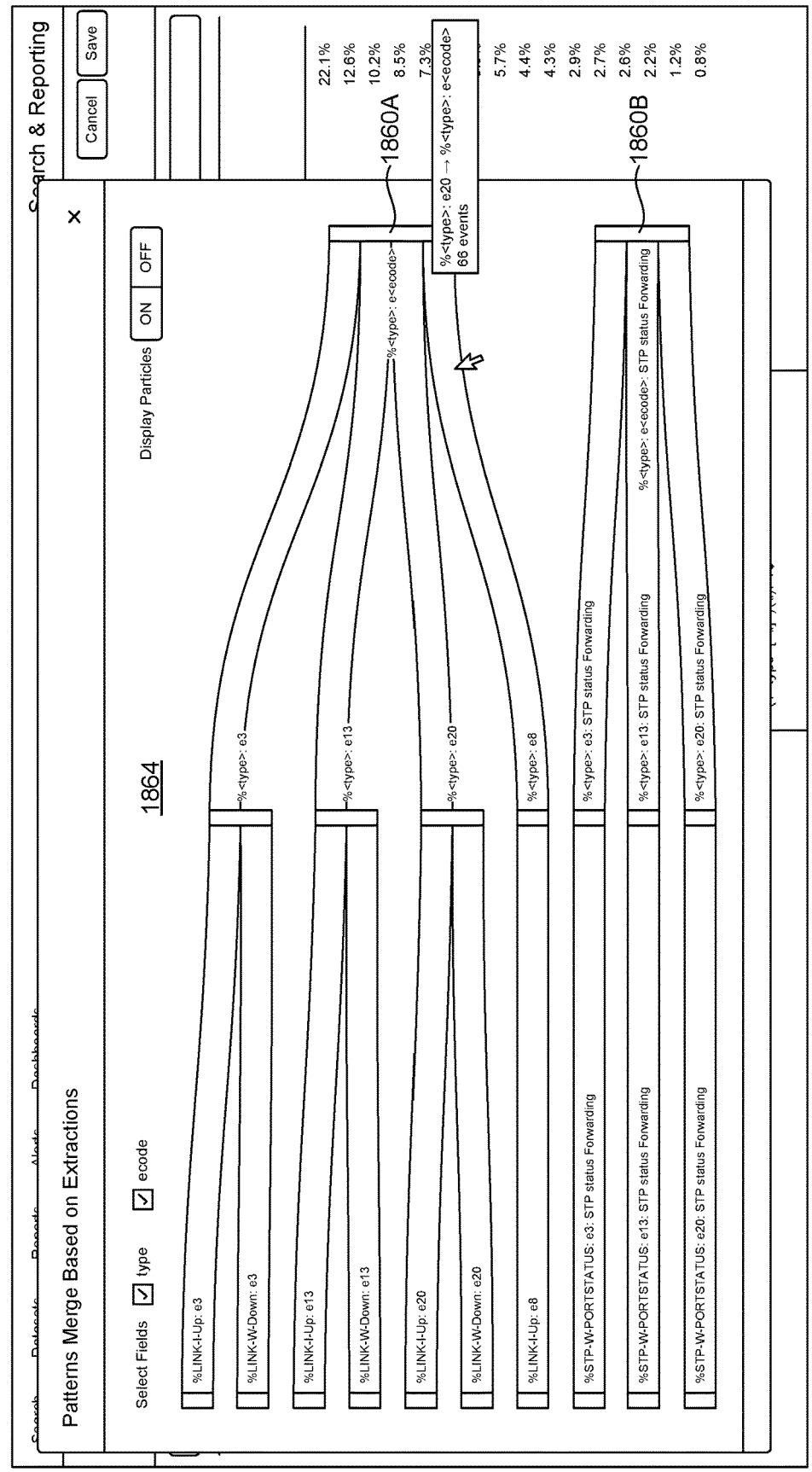
FIG. 18G illustrates an example of a field generation interface in accordance with the disclosed embodiments.

As indicated in FIG. 18F, the original events have been narrowed down to two clusters, clusters 1860A and 1860B. FIG. 18G shows visualization 1864, which is similar to visualization 1840, and therefore is not described in significant detail. As indicated using checkboxes, the user can selectably remove one or more fields from visualization 1840, causing the visualization to be updated accordingly.

It is noted, in the present example, the user can exit field generation interface 1800 at any stage of field generation, such as by selecting GUI control element 1866, or the user can continue to generate extraction rules for fields. This can be one approach to saving the generated fields, or the fields can be saved as they are generated.

In various implementations, the extraction rules can be utilized by a field extractor described above. As an example, the generated fields could be applied to the search interface optionally used to enter the field generation interface. For example, the generated fields can be automatically added to fields sidebar 606 as selected and/or interesting fields. Thus, the generated fields can be added to the fields utilized by the search interface corresponding to search screen 600. Further, the user may optionally re-enter field generation interface 1800 from the search interface in order to redefine fields and/or generate additional fields.

In addition, or instead, the generated extraction rules can be applied to new events. For example, the generated extraction rules could be saved in associated with the selected source type(s) and applied to different events corresponding to the source type. This can be used, for example, to associate a pre-defined late-binding schemas to particular source types. Thus, the generated fields and associated extraction rules can be used to extract values for the fields from events, and the extracted values may be presented to the user in an graphical interface, such as a graphical interface corresponding to search screen 600.

As indicated above, the workflow illustrated using field generation interface 1800 can vary widely from what has been shown, using any number of screens and any number of display formats. For example, a set of clusters, and an updated set of clusters may be presented to a user on any number of screens, such as a single screen. Further, the approach of presenting clusters by selecting events for display based on their corresponding cluster, and updating the displayed events when the clusters are updated can change. More generally, presentation of a set of clusters as used herein refers to any information presented based on the set of clusters. For example, a cluster may be presented by highlighting one or more portions of event data based on the cluster.

It is also noted, events displayed to the user in association with extraction rule generation could be static or otherwise independent from a set of clusters, and when a new set of clusters is generated, the highlighting or other visual indicators could be updated to reflect the updated clusters. Further, in some cases, the field generation interface is completely or partially integrated into one or more search screens of a search interface, such as the search interface corresponding to search screen 600, or another search interface that causes events to be presented to users. For example, the user may select sample data, such as sample values from an events list, such as events list 608. Further, any combination of the various visual indicators applied to event data may be applied to the events in the events list. In particular, any combination of the user features and portions thereof described with respect to field generation interface 1800 may be integrated into search screen 600, or another search screen, such as the entries of generated fields, the extraction rule adjustment interface, and the like.

3.4 Additional Implementations

FIG. 19 presents a flowchart illustrating a method in accordance with the disclosed embodiments. Each block illustrating methods in accordance with FIG. 19, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 1902, a first cluster is presented from a first set of clusters. For example, the system can cause presentation of cluster 1806A in association with an event of cluster 1806A, as shown in FIG. 18B. The first cluster is from a first set of clusters of events, each event comprising a time stamp and event data.

At block 1904, an extraction rule is received from a user. For example, based on the presentation of cluster 1806A, the system can receive from a user extraction rule 1870 corresponding to the event of cluster 1806A. This can optionally involve an extraction rule adjustment interface, such as is described with respect to FIG. 18C.

At block 1906, similarities are determined in event data based on the extraction rule. For example, the system can determine similarities in the event data between the events based on the received extraction rule. This can include masking event data based on the extraction rule, and comparing the masked event data, applying the extraction rule to the event data to identify values for a field, and/or otherwise factoring in one or more extraction rules into a similarity metric for clustering, examples of which have been described above.

At block 1908, events are grouped into a second set of clusters based on the determined similarities. For example, the system can group the events into a second set of clusters based on the determined similarities.

At block 1910, a second cluster from the second set of clusters in presented. For example, the system can cause presentation of cluster 1842A in association with an event of cluster 1842A, where the second cluster is from the second set of clusters, as shown in FIG. 18D.

FIG. 20 presents a flowchart illustrating a method in accordance with the disclosed embodiments. At block 2002, events are clustered based on a set of extraction rules associated with a set of fields. As used herein, a set of extraction rules can include one or more extraction rules and a set of fields can include one or more fields. As an example, the system can cluster events corresponding to source type 1804 based on a set of extraction rules corresponding to at least one metadata field of the events. The clusters can include clusters 1806 presented in FIG. 18B.

At block 2004, clusters are presented in association with corresponding events. For example, as shown in FIG. 18B, the system can cause presentation of clusters 1806 in association with corresponding events from the clusters. As noted above, every cluster may be presented or only a subset of the clusters may be presented. In some cases, the presentation of each cluster may be viewable in a screen, but not necessarily concurrently (e.g., they may be viewable via a GUI element like a scroll bar).

At block 2006, an extraction rule is added for a field to the set of extraction rules. For example, extraction rule 1870 can be added to the set of extraction rules by the user for the field named "type." Method 2000 can optionally be repeated any number of times, as indicated in FIG. 20. FIGS. 18D through 18F can correspond to another iteration of method 2000, in which the events are clustered based on both the at least one metadata field and extraction rule 1870. Further, the extraction rule corresponding to the field named "ecode" may be added to the set of extraction rules.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. A computer-implemented method, comprising:
causing display of a first cluster from a first set of clusters of events, each event comprising a time stamp and a portion of raw machine data, wherein the raw machine data is produced by one or more components within an information technology environment and reflects activity within the information technology environment;
receiving a user selection of a sample value for a field in a first event in the displayed first cluster;
generating an extraction rule for the field based on the sample value and the user selection of the sample value;
applying the generated extraction rule to the events to identify values from the events;
determining a second set of clusters of the events based on similarities between the events, the similarities quantified by a similarity metric determined using a comparison between the events, wherein the determining includes excluding from the comparison portions in the events that correspond to the values based on the values being identified by the generated extraction rule; and
causing presentation of a second cluster from the second set of clusters.

2. The computer-implemented method of claim 1, wherein the excluding comprises masking text corresponding to the values from the events, wherein the comparison is between the masked events.

3. The computer-implemented method of claim 1, wherein the excluding comprises tokenizing text portions of the events that correspond to the values, wherein the determining of the comparison is between the tokenized text portions.

4. The computer-implemented method of claim 1, wherein the first set of clusters is determined based on additional similarities quantified by the similarity metric, the similarity metric determined based on comparing the events including the portions in the events that correspond to the values.

5. The computer-implemented method of claim 1, wherein the second set of clusters of the events is determined by a clustering algorithm based on first similarities between the events that are quantified by the similarity metric of the clustering algorithm, and wherein the first set of clusters of the events is determined by the clustering algorithm based on second similarities between the events that are quantified by the similarity metric of the clustering algorithm, the second similarities determined using an additional comparison between the events that includes the portions of the events that correspond to the values.

6. The computer-implemented method of claim 1, further comprising:
grouping the events into the first set of clusters based on a set of one or more extraction rules; and
adding the identified extraction rule to the set of one or more extraction rules, wherein the excluding is of a set of values identified using each extraction rule in the set of one or more extraction rules.

7. The computer-implemented method of claim 1, wherein the generating of the extraction rule comprises machine-generating at least a portion of the extraction rule based on the sample value, wherein the user selection identifies the sample value in the first event.

8. The computer-implemented method of claim 1, wherein the generating of the extraction rule comprises:
machine-generating the extraction rule based on the user selection, wherein the user selection identifies the sample value for the first event;
causing presentation of a set of values extracted from one or more of the events using the machine-generated extraction rule; and
applying user adjustments to the machine-generated extraction rule in association with the presented set of values.

9. The computer-implemented method of claim 1, further comprising applying a late-binding schema to the events using the extraction rule.

10. The computer-implemented method of claim 1, wherein the display of the first cluster comprises displaying a plurality of clusters from the first set of clusters, each cluster being displayed in association with at least one event of the cluster.

11. The computer-implemented method of claim 1, wherein the presentation of the second cluster identifies a set of values identified in the events using the extraction rule.

12. The computer-implemented method of claim 1, further comprising:
generating an additional extraction rule for an additional field based on an additional sample value and an additional user selection of the additional sample value;
applying the generated additional extraction rule and the extraction rule to the events;
determining additional similarities between the events, the determining excluding additional values identified from the events by the applying of the generated additional extraction rule and the extraction rule;
grouping the events into a third set of clusters, each cluster in the third set of clusters being based on the determined additional similarities between the events; and
causing presentation of a third cluster from the third set of clusters.

13. The computer-implemented method of claim 1, further comprising:
generating an additional extraction rule for an additional field based on an additional sample value and an additional user selection of the additional sample value; and based on the generating of the additional extraction rule, causing presentation of at least one of the events, wherein the presentation identifies at least one value in each of the at least one of the events for each of the extraction rule and the additional extraction rule.

14. The computer-implemented method of claim 1, wherein the presentation of the second cluster identifies a portion of text in a second event from the second cluster as corresponding to the extraction rule.

15. The computer-implemented method of claim 1, further comprising:
saving the extraction rule in association with the field;
receiving, in a search interface, a search query;
based on the receiving of the search query, extracting a set of values of the field from a set of events corresponding to the search query using the saved extraction rule; and
causing display of the extracted set of values in association with the set of events in the search interface.

16. The computer-implemented method of claim 1, further comprising grouping the events into the first set of clusters based on previously-determined similarities of the events, the previously-determined similarities determined based on a metadata field assigned to the events by an indexer.

17. The computer-implemented method of claim 1, further comprising:
identifying the events based on determining each event corresponds to at least one user-selected source type;
saving the extraction rule in association with the at least one user-selected source type; and
applying the saved extraction rule to a set of events based on identifying the set of events correspond to the at least one user-selected source type.

18. A system comprising:
one or more processors; and
computer memory having instructions stored thereon, the instructions, when executed by the one or more processors causing the system to perform a method comprising:
causing display of a first cluster from a first set of clusters of events, each event comprising a time stamp and a portion of raw machine data, wherein the raw machine data is produced by one or more components within an information technology environment and reflects activity within the information technology environment;
receiving a user selection of a sample value for a field in a first event in the displayed first cluster;
generating an extraction rule for the field based on the sample value and the user selection of the sample value;
applying the generated extraction rule to the events to identify values from the events;
determining a second set of clusters of the events based on similarities between the events, the similarities quantified by a similarity metric determined using a comparison between the events, wherein the determining includes excluding from the comparison portions in the events that correspond to the values based on the values being identified by the generated extraction rule; and
causing presentation of a second cluster from the second set of clusters.

19. The system of claim 18, wherein the excluding comprises masking text corresponding to the values from the events, wherein the determining of the comparison is between the masked events.

20. The system of claim 18, wherein the excluding comprises tokenizing text portions of the events that correspond to the values, wherein the determining of the comparison is between the tokenized text portions.

21. The system of claim 18, wherein the presentation of the second cluster is based on a user assignment of the extraction rule to the field.

22. The system of claim 18, wherein the method further comprises grouping the events into the first set of clusters based on previously-determined similarities between the events.

23. The system of claim 18, wherein the method further comprises:
grouping the events into the first set of clusters based on a set of one or more extraction rules; and
adding the identified extraction rule to the set of one or more extraction rules, wherein the excluding is of a set of values identified using each extraction rule in the set of one or more extraction rules.

24. The system of claim 18, wherein the generating of the extraction rule comprises machine-generating at least a portion of the extraction rule based on the sample value, wherein the user selection identifies the sample value in the first event.

25. One or more computer-readable media having instructions stored thereon, the instructions, when executed by a processor of a computing device, to cause the computing device to perform a method comprising:
causing display of a first cluster from a first set of clusters of events, each event comprising a time stamp and a portion of raw machine data, wherein the raw machine data is produced by one or more components within an information technology environment and reflects activity within the information technology environment;
receiving a user selection of a sample value for a field in a first event in the displayed first cluster;
generating an extraction rule for the field based on the sample value and the user selection of the sample value;
applying the generated extraction rule to the events to identify values from the events;
determining a second set of clusters of the events based on similarities between the events, the similarities quantified by a similarity metric determined using a comparison between the events, wherein the determining includes excluding from the comparison portions in the events that correspond to the values based on the values being identified by the generated extraction rule; and
causing presentation of a second cluster from the second set of clusters.

26. The one or more computer-readable media of claim 25, wherein the excluding comprises masking text corresponding to the values from the events, wherein the determining of the comparison is between the masked events.

27. The one or more computer-readable media of claim 25, wherein the excluding comprises tokenizing text portions of the events that correspond to the values, wherein the determining of the comparison is between the tokenized text portions.

28. The one or more computer-readable media of claim 25, wherein the presentation of the second cluster is based on a user assignment of the extraction rule to the field.

29. The one or more computer-readable media of claim 25, wherein the method further comprises grouping the events into the first set of clusters based on previously-determined similarities between the events.

30. The one or more computer-readable media of claim 25, wherein the method further comprises:
grouping the events into the first set of clusters based on a set of one or more extraction rules; and
adding the identified extraction rule to the set of one or more extraction rules, wherein the excluding is of a set of values identified using each extraction rule in the set of one or more extraction rules.

* * * * *